(12) United States Patent
Costa

(10) Patent No.: US 12,156,296 B2
(45) Date of Patent: Nov. 26, 2024

(54) INTELLIGENT OFFLOADING OF TRAFFIC TO PUBLIC AND PRIVATE WI-FI HOTSPOTS LEVERAGING THE CLOUD IN A NETWORK OF MOVING THINGS INCLUDING, FOR EXAMPLE, AUTONOMOUS VEHICLES

(71) Applicant: Nexar Ltd., Tel Aviv (IL)

(72) Inventor: Rui Miguel Correia e Costa, S. João das Lampas (PT)

(73) Assignee: Nexar Ltd., Tel Aviv (IL)

( * ) Notice: Subject to any disclaimer, the term of this patent is extended or adjusted under 35 U.S.C. 154(b) by 0 days.

(21) Appl. No.: 16/905,061

(22) Filed: Jun. 18, 2020

(65) Prior Publication Data
US 2020/0404745 A1    Dec. 24, 2020

Related U.S. Application Data

(60) Provisional application No. 62/863,393, filed on Jun. 19, 2019.

(51) Int. Cl.
| | | |
|---|---|---|
| *H04W 88/10* | (2009.01) | |
| *H04W 28/02* | (2009.01) | |
| *H04W 48/16* | (2009.01) | |
| *H04W 64/00* | (2009.01) | |
| *H04W 76/15* | (2018.01) | |
| *H04W 88/12* | (2009.01) | |

(52) U.S. Cl.
CPC ....... *H04W 88/10* (2013.01); *H04W 28/0268* (2013.01); *H04W 48/16* (2013.01); *H04W 64/003* (2013.01); *H04W 76/15* (2018.02); *H04W 88/12* (2013.01)

(58) Field of Classification Search
None
See application file for complete search history.

(56) References Cited

U.S. PATENT DOCUMENTS

| | | | |
|---|---|---|---|
| 9,565,578 B2* | 2/2017 | Chu .................. | H04W 24/02 |
| 2010/0299703 A1* | 11/2010 | Altman .............. | H04H 60/04 |
| | | | 709/204 |
| 2012/0297055 A9 | 11/2012 | Raleigh | |
| 2014/0064068 A1 | 3/2014 | Horn et al. | |
| 2014/0247807 A1 | 9/2014 | Westerberg et al. | |
| 2014/0274069 A1* | 9/2014 | Scheim .............. | H04W 28/08 |
| | | | 455/444 |
| 2014/0328190 A1* | 11/2014 | Lord ................. | H04W 24/08 |
| | | | 370/252 |
| 2016/0234124 A1 | 8/2016 | Tomici et al. | |
| 2017/0026887 A1 | 1/2017 | Sirotkin et al. | |
| 2017/0085437 A1* | 3/2017 | Condeixa .......... | H04W 24/10 |
| 2017/0215105 A1* | 7/2017 | Tan Bergstrom ... | H04W 48/18 |
| 2017/0280361 A1* | 9/2017 | Cabral .............. | H04W 84/12 |
| 2018/0211534 A1 | 7/2018 | de Moura | |

(Continued)

OTHER PUBLICATIONS

International Search Report and Written Opinion for PCT/US2020/038441, mailed Sep. 30, 2020, 17 pages.

(Continued)

*Primary Examiner* — German Viana Di Prisco
(74) *Attorney, Agent, or Firm* — Soquel Group I.P Ltd.

(57) ABSTRACT

Systems and methods are provided for intelligent offloading of traffic to public and private Wi-Fi hotspots leveraging the cloud in a network of moving things.

20 Claims, 10 Drawing Sheets

(56) References Cited

U.S. PATENT DOCUMENTS

2018/0317146 A1    11/2018  Fitzpatrick
2018/0338247 A1*   11/2018  Sagar ................. H04W 72/042
2018/0375939 A1    12/2018  Magalhães de Matos
2022/0007438 A1*   1/2022   Agrawal .............. H04B 17/318

OTHER PUBLICATIONS

Extended European Search Report for EP20826975, completed Apr. 5, 2023, 17 pages.

* cited by examiner

INTELLIGENT OFFLOADING OF TRAFFIC TO PUBLIC AND PRIVATE WI-FI HOTSPOTS LEVERAGING THE CLOUD IN A NETWORK OF MOVING THINGS INCLUDING, FOR EXAMPLE, AUTONOMOUS VEHICLES

CLAIM OF PRIORITY

This patent application claims priority to and benefit from U.S. Provisional Patent Application Ser. No. 62/863,393, filed Jun. 19, 2019. The above identified application is hereby incorporated herein by reference in its entirety.

CROSS-REFERENCE TO RELATED APPLICATIONS/INCORPORATION BY REFERENCE

This patent application is related to:

U.S. Provisional Application Ser. No. 62/221,997, titled "Integrated Communication Network for a Network of Moving Things," filed on Sep. 22, 2015;

U.S. Provisional Application Ser. No. 62/222,016, titled "Systems and Methods for Synchronizing a Network of Moving Things," filed on Sep. 22, 2015;

U.S. Provisional Application Ser. No. 62/222,042, titled "Systems and Methods for Managing a Network of Moving Things," filed on Sep. 22, 2015;

U.S. Provisional Application Ser. No. 62/222,066, titled "Systems and Methods for Monitoring a Network of Moving Things," filed on Sep. 22, 2015;

U.S. Provisional Application Ser. No. 62/222,077, titled "Systems and Methods for Detecting and Classifying Anomalies in a Network of Moving Things," filed on Sep. 22, 2015;

U.S. Provisional Application Ser. No. 62/222,098, titled "Systems and Methods for Managing Mobility in a Network of Moving Things," filed on Sep. 22, 2015;

U.S. Provisional Application Ser. No. 62/222,121, titled "Systems and Methods for Managing Connectivity a Network of Moving Things," filed on Sep. 22, 2015;

U.S. Provisional Application Ser. No. 62/222,135, titled "Systems and Methods for Collecting Sensor Data in a Network of Moving Things," filed on Sep. 22, 2015;

U.S. Provisional Application Ser. No. 62/222,145, titled "Systems and Methods for Interfacing with a Network of Moving Things," filed on Sep. 22, 2015;

U.S. Provisional Application Ser. No. 62/222,150, titled "Systems and Methods for Interfacing with a User of a Network of Moving Things," filed on Sep. 22, 2015;

U.S. Provisional Application Ser. No. 62/222,168, titled "Systems and Methods for Data Storage and Processing for a Network of Moving Things," filed on Sep. 22, 2015;

U.S. Provisional Application Ser. No. 62/222,183, titled "Systems and Methods for Vehicle Traffic Management in a Network of Moving Things," filed on Sep. 22, 2015, U.S. Provisional Application Ser. No. 62/222,186, titled "Systems and Methods for Environmental Management in a Network of Moving Things," filed on Sep. 22, 2015;

U.S. Provisional Application Ser. No. 62/222,190, titled "Systems and Methods for Port Management in a Network of Moving Things," filed on Sep. 22, 2015;

U.S. Provisional Patent Application Ser. No. 62/222,192, titled "Communication Network of Moving Things," filed on Sep. 22, 2015;

U.S. Provisional Application Ser. No. 62/244,828, titled "Utilizing Historical Data to Correct GPS Data in a Network of Moving Things," filed on Oct. 22, 2015;

U.S. Provisional Application Ser. No. 62/244,930, titled "Using Anchors to Correct GPS Data in a Network of Moving Things," filed on Oct. 22, 2015;

U.S. Provisional Application Ser. No. 62/246,368, titled "Systems and Methods for Inter-Application Communication in a Network of Moving Things," filed on Oct. 26, 2015;

U.S. Provisional Application Ser. No. 62/246,372, titled "Systems and Methods for Probing and Validating Communication in a Network of Moving Things," filed on Oct. 26, 2015;

U.S. Provisional Application Ser. No. 62/250,544, titled "Adaptive Rate Control for Vehicular Networks," filed on Nov. 4, 2015;

U.S. Provisional Application Ser. No. 62/273,878, titled "Systems and Methods for Reconfiguring and Adapting Hardware in a Network of Moving Things," filed on Dec. 31, 2015;

U.S. Provisional Application Ser. No. 62/253,249, titled "Systems and Methods for Optimizing Data Gathering in a Network of Moving Things," filed on Nov. 10, 2015;

U.S. Provisional Application Ser. No. 62/257,421, titled "Systems and Methods for Delay Tolerant Networking in a Network of Moving Things," filed on Nov. 19, 2015;

U.S. Provisional Application Ser. No. 62/265,267, titled "Systems and Methods for Improving Coverage and Throughput of Mobile Access Points in a Network of Moving Things," filed on Dec. 9, 2015;

U.S. Provisional Application Ser. No. 62/270,858, titled "Channel Coordination in a Network of Moving Things," filed on Dec. 22, 2015;

U.S. Provisional Application Ser. No. 62/257,854, titled "Systems and Methods for Network Coded Mesh Networking in a Network of Moving Things," filed on Nov. 20, 2015;

U.S. Provisional Application Ser. No. 62/260,749, titled "Systems and Methods for Improving Fixed Access Point Coverage in a Network of Moving Things," filed on Nov. 30, 2015;

U.S. Provisional Application Ser. No. 62/273,715, titled "Systems and Methods for Managing Mobility Controllers and Their Network Interactions in a Network of Moving Things," filed on Dec. 31, 2015;

U.S. Provisional Application Ser. No. 62/281,432, titled "Systems and Methods for Managing and Triggering Handovers of Mobile Access Points in a Network of Moving Things," filed on Jan. 21, 2016;

U.S. Provisional Application Ser. No. 62/268,188, titled "Captive Portal-related Control and Management in a Network of Moving Things," filed on Dec. 16, 2015;

U.S. Provisional Application Ser. No. 62/270,678, titled "Systems and Methods to Extrapolate High-Value Data from a Network of Moving Things," filed on Dec. 22, 2015, U.S. Provisional Application Ser. No. 62/272,750, titled "Systems and Methods for Remote Software Update and Distribution in a Network of Moving Things," filed on Dec. 30, 2015;

U.S. Provisional Application Ser. No. 62/278,662, titled "Systems and Methods for Remote Configuration Update and Distribution in a Network of Moving Things," filed on Jan. 14, 2016;

U.S. Provisional Application Ser. No. 62/286,243, titled "Systems and Methods for Adapting a Network of Moving Things Based on User Feedback," filed on Jan. 22, 2016;

U.S. Provisional Application Ser. No. 62/278,764, titled "Systems and Methods to Guarantee Data Integrity When Building Data Analytics in a Network of Moving Things," Jan. 14, 2016;

U.S. Provisional Application Ser. No. 62/286,515, titled "Systems and Methods for Self-Initialization and Automated Bootstrapping of Mobile Access Points in a Network of Moving Things," filed on Jan. 25, 2016;

U.S. Provisional Application Ser. No. 62/295,602, titled "Systems and Methods for Power Management in a Network of Moving Things," filed on Feb. 16, 2016; and U.S. Provisional Application Ser. No. 62/299,269, titled "Systems and Methods for Automating and Easing the Installation and Setup of the Infrastructure Supporting a Network of Moving Things," filed on Feb. 24, 2016.

Each of the above identified applications is hereby incorporated herein by reference in its entirety for all purposes.

BACKGROUND

Current communication networks are unable to adequately support communication environments involving static and mobile nodes, including, for example, autonomous vehicles. As a non-limiting example, current communication networks are unable to adequately support a network comprising a complex array of both moving and static nodes (e.g., the Internet of moving things, autonomous vehicle networks, etc.).

Limitations and disadvantages of conventional methods and systems will become apparent to one of skill in the art, through comparison of such approaches with some aspects of the present methods and systems set forth in the remainder of this disclosure with reference to the drawings.

BRIEF SUMMARY

Various aspects of this disclosure provide communication network architectures, systems and methods for supporting and/or effectively utilizing a network of mobile and/or static nodes. As a non-limiting example, various aspects of this disclosure provide communication network architectures, systems, and methods for supporting a dynamically configurable communication network comprising a complex array of both static and moving communication nodes (e.g., the Internet of moving things, autonomous vehicle networks, etc.). For example, a communication network implemented in accordance with various aspects of the present disclosure may operate in one of a plurality of modalities comprising various fixed nodes, mobile nodes, and/or a combination thereof, which are selectable to achieve any of a variety of system goals. In various example implementations in accordance with the present disclosure, such communication networks may be configured for intelligent offloading of traffic to public and private Wi-Fi hotspots leveraging the cloud.

DETAILED DESCRIPTION

Figure 1:
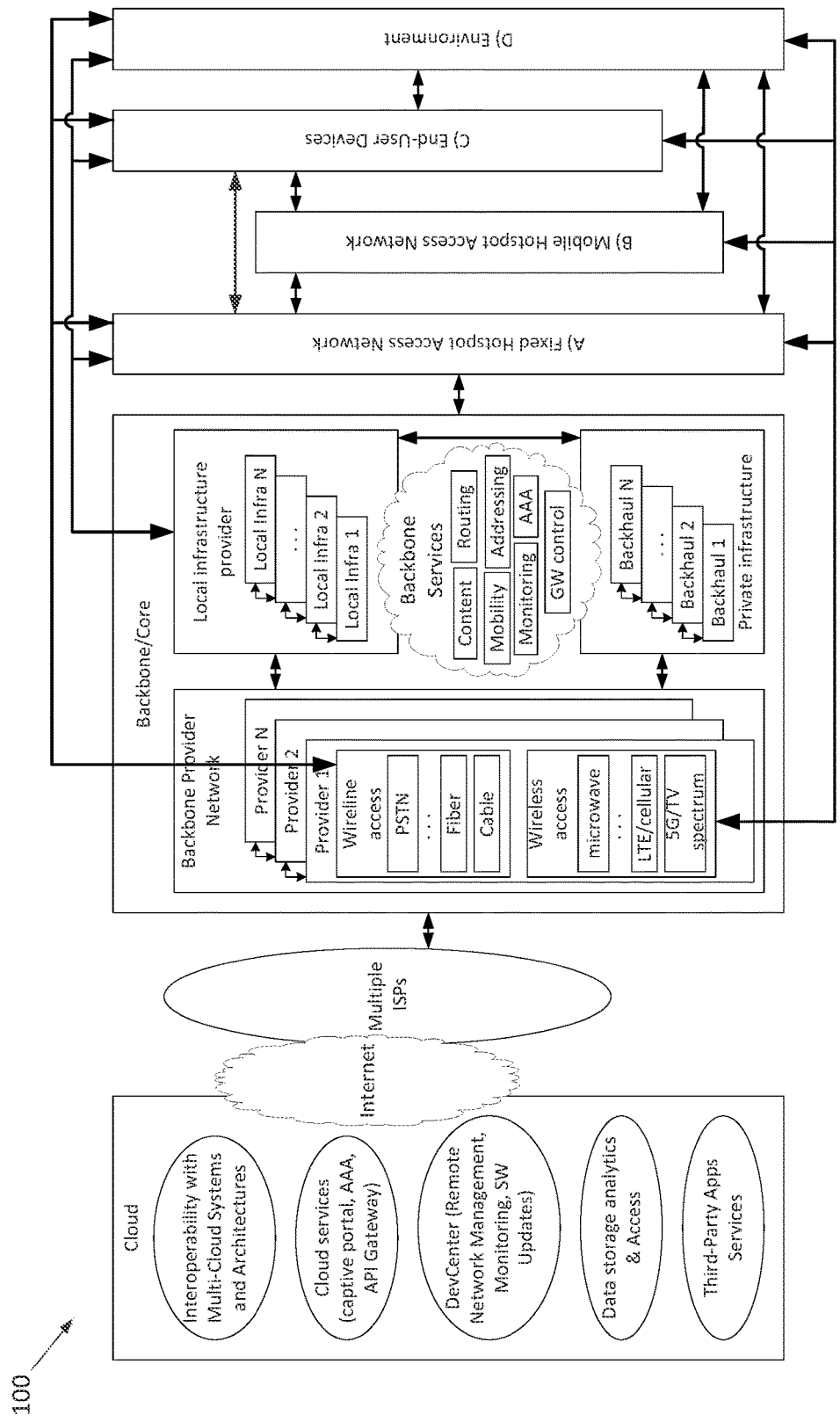
FIG. 1 shows a block diagram of a communication network, in accordance with various aspects of this disclosure.

As utilized herein the terms "circuits" and "circuitry" refer to physical electronic components (e.g., hardware), and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (e.g., hardware) and any software and/or firmware ("code") that may configure the hardware, be executed by the hardware, and or otherwise be associated with the hardware.

As utilized herein, circuitry or module is "operable" to perform a function whenever the circuitry or module comprises the necessary hardware and code (if any is necessary) to perform the function, regardless of whether performance of the function is disabled or not enabled (e.g., by a user-configurable setting, factory trim, etc.).

As utilized herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y and/or z" means "one or more of x, y, and z." As utilized herein, the term "exemplary" means serving as a non-limiting example, instance, or illustration. As utilized herein, the terms "for example" and "e.g." set off lists of one or more non-limiting examples, instances, or illustrations.

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example an electronic device may be turned sideways so that its "top" surface is facing horizontally and its "side" surface is facing vertically, without departing from the teachings of the present disclosure.

With the proliferation of the mobile and/or static things (e.g., devices, machines, people, etc.) and logistics for such things to become connected to each other (e.g., in the contexts of smart logistics, transportation, environmental sensing, etc.), a platform that is for example always-on, robust, scalable and secure that is capable of providing connectivity, services and Internet access to such things (or objects), anywhere and anytime is desirable. Efficient power utilization within the various components of such system is also desirable.

Accordingly, various aspects of the present disclosure provide a fully-operable, always-on, responsive, robust, scalable, secure platform/system/architecture to provide connectivity, services and Internet access to all mobile things and/or static things (e.g., devices, machines, people, access points, end user devices, sensors, etc.) anywhere and anytime, while operating in an energy-efficient manner.

Various aspects of the present disclosure provide a platform that is flexibly configurable and adaptable to the various requirements, features, and needs of different environments, where each environment may be characterized by a respective level of mobility and density of mobile and/or static things, and the number and/or types of access to those things. Characteristics of various environments may, for example, include high mobility of nodes (e.g., causing contacts or connections to be volatile), high number of neighbors, high number of connected mobile users, mobile access points, availability of multiple networks and technologies (e.g., sometimes within a same area), etc. For example, the mode of operation of the platform may be flexibly adapted from environment to environment, based on each environment's respective requirements and needs, which may be different from other environments. Additionally for example, the platform may be flexibly optimized (e.g., at design/installation time and/or in real-time) for different purposes (e.g., to reduce the latency, increase throughput, reduce power consumption, load balance, increase reliability, make more robust with regard to failures or other disturbances, etc.), for example based on the content, service or data that the platform provides or handles within a particular environment.

In accordance with various aspects of the present disclosure, many control and management services (e.g., mobility, security, routing, etc.) are provided on top of the platform (e.g., directly, using control overlays, using containers, etc.), such services being compatible with the services currently deployed on top of the Internet or other communication network(s).

The communication network (or platform), in whole or in part, may for example be operated in public and/or private modes of operation, for example depending on the use case. The platform may, for example, operate in a public or private mode of operation, depending on the use-case (e.g., public Internet access, municipal environment sensing, fleet operation, etc.).

Additionally for example, in an implementation in which various network components are mobile, the transportation and/or signal control mechanisms may be adapted to serve the needs of the particular implementation. Also for example, wireless transmission power and/or rate may be adapted (e.g., to mitigate interference, to reduce power consumption, to extend the life of network components, etc.

Various example implementations of a platform, in accordance with various aspects of the present disclosure, are capable of connecting different subsystems, even when various other subsystems that may normally be utilized are unavailable. For example, the platform may comprise various built-in redundancies and fail-recovery mechanisms. For example, the platform may comprise a self-healing capability, self-configuration capability, self-adaptation capability, etc. The protocols and functions of the platform may, for example, be prepared to be autonomously and smoothly configured and adapted to the requirements and features of different environments characterized by different levels of mobility and density of things (or objects), the number/types of access to those things. For example, various aspects of the platform may gather context parameters that can influence any or all decisions. Such parameters may, for example, be derived locally, gathered from a neighborhood, fixed APs, the Cloud, etc. Various aspects of the platform may also, for example, ask for historical information to feed any of the decisions, where such information can be derived from historical data, from surveys, from simulators, etc. Various aspects of the platform may additionally, for example, probe or monitor decisions made throughout the network, for example to evaluate the network and/or the decisions themselves in real-time. Various aspects of the platform may further, for example, enforce the decisions in the network (e.g., after evaluating the probing results). Various aspects of the platform may, for example, establish thresholds to avoid any decision that is to be constantly or repeatedly performed without any significant advantage (e.g., technology change, certificate change, IP change, etc.). Various aspects of the platform may also, for example, learn locally (e.g., with the decisions performed) and dynamically update the decisions.

In addition to (or instead of) failure robustness, a platform may utilize multiple connections (or pathways) that exist between distinct sub-systems or elements within the same sub-system, to increase the robustness and/or load-balancing of the system.

The following discussion will present examples of the functionality performed by various example subsystems of the communication network. It should be understood that the example functionality discussed herein need not be performed by the particular example subsystem or by a single subsystem. For example, the subsystems present herein may interact with each other, and data or control services may be deployed either in a centralized way, or having their functionalities distributed among the different subsystems, for example leveraging the cooperation between the elements of each subsystem.

Various aspects of the present disclosure provide a communication network (e.g., a city-wide vehicular network, a shipping port-sized vehicular network, a campus-wide vehicular network, etc.) that utilizes vehicles (e.g., automobiles, buses, trucks, boats, forklifts, human-operated vehicles, autonomous and/or remote controlled vehicles, etc.) as Wi-Fi hotspots. Note that Wi-Fi is generally used throughout this discussion as an example, but the scope of various aspects of this disclosure is not limited thereto. For example, other wireless LAN technologies, PAN technologies, MAN technologies, etc., may be utilized. Such utilization may, for example, provide cost-effective ways to gather substantial amounts of urban data, and provide for the efficient offloading of traffic from congested cellular networks (or other networks). In controlled areas (e.g., ports, harbors, etc.) with many vehicles, a communication network in accordance with various aspects of this disclosure may expand the wireless coverage of existing enterprise Wi-Fi networks, for example providing for real-time communication with vehicle drivers (e.g., human, computer-controlled, etc.) and other mobile employees without the need for SIM cards or cellular (or other network) data plans.

Vehicles may have many advantageous characteristics that make them useful as Wi-Fi (or general wireless) hotspots. For example, vehicles generally have at least one battery, vehicles are generally densely spread over the city at street level and/or they are able to establish many contacts with each other in a controlled space, and vehicles can communicate with 10× the range of normal Wi-Fi in the 5.9 GHz frequency band, reserved for intelligent transportation systems in the EU, the U.S., and elsewhere. Note that the scope of this disclosure is not limited to such 5.9 GHz wireless communication. Further, vehicles are able to effectively expand their coverage area into a swath over a period of time, enabling a single vehicle access point to interact with substantially more data sources over the period of time.

In accordance with various aspects of the present disclosure, an affordable multi-network on-board unit (OBU) is presented. Note that the OBU may also be referred to herein as a mobile access point, mobile AP, MAP, etc. The OBU may, for example, comprise a plurality of networking interfaces (e.g., Wi-Fi, 802.11p, 4G, Bluetooth, UWB, etc.). The OBU may, for example, be readily installed in or on private and/or public vehicles (e.g., individual user vehicles, vehicles of private fleets, vehicles of public fleets, etc.). The OBU may, for example, be installed in transportation fleets, waste management fleets, law enforcement fleets, emergency services, road maintenance fleets, taxi fleets, aircraft fleets, etc. The OBU may, for example, be installed in or on a vehicle or other structure with free mobility or relatively limited mobility. The OBU may also, for example, be carried by a person or service animal, mounted to a bicycle, mounted to a moving machine in general, mounted to a container, etc.

The OBUs may, for example, operate to connect passing vehicles to the wired infrastructure of one or more network providers, telecom operators, etc. In accordance with the architecture, hardware, and software functionality discussed herein, vehicles and fleets can be connected not just to the cellular networks (or other wide area or metropolitan area networks, etc.) and existing Wi-Fi hotspots spread over a city or a controlled space, but also to other vehicles (e.g., utilizing multi-hop communications to a wired infrastructure, single or multi-hop peer-to-peer vehicle communication, etc.). The vehicles and/or fleets may, for example, form an overall mesh of communication links, for example including the OBUs and also fixed access points (APs) connected to the wired infrastructure (e.g., a local infrastructure, etc.). Note that OBUs herein may also be referred to as "mobile APs," "mobile hotspots," "MAPs," etc. Also note that fixed access points may also be referred to herein as Road Side Units (RSUs), fixed APs (FAPs), etc.

In an example implementation, the OBUs may communicate with the fixed APs utilizing a relatively long-range protocol (e.g., 802.11p, etc.), and the fixed APs may, in turn, be hard wired to the wired infrastructure (e.g., via cable, tethered optical link, etc.). Note that fixed APs may also, or alternatively, be coupled to the infrastructure via wireless link (e.g., 802.11p, etc.). Additionally, clients or user devices may communicate with the OBUs using one or more relatively short-range protocols (e.g., Wi-Fi, Bluetooth, UWB, etc.). The OBUs, for example having a longer effective wireless communication range than typical Wi-Fi access points or other wireless LAN/PAN access points (e.g., at least for links such as those based on 802.11p, etc.), are capable of substantially greater coverage areas than typical Wi-Fi or other wireless LAN/PAN access points, and thus fewer OBUs are necessary to provide blanket coverage over a geographical area.

The OBU may, for example, comprise a robust vehicular networking module (e.g., a Wi-Fi connection manager) which builds on long-range communication protocol capability (e.g., 802.11p, etc.). For example, in addition to comprising 802.11p (or other long-range protocol) capability to communicate with fixed APs, vehicles, and other nodes in the network, the OBU may comprise a network interface (e.g., 802.11a/b/g/n, 802.11ac, 802.11af, any combination thereof, etc.) to provide wireless local area network (WLAN) connectivity to end user devices, sensors, fixed Wi-Fi access points, etc. For example, the OBU may operate to provide in-vehicle Wi-Fi Internet access to users in and/or around the vehicle (e.g., a bus, train car, taxi cab, public works vehicle, etc.). The OBU may further comprise one or more wireless backbone communication interfaces (e.g., cellular network interfaces, etc.). Though in various example scenarios, a cellular network interface (or other wireless backbone communication interface) might not be the preferred interface for various reasons (e.g., cost, power, bandwidth, etc.), the cellular network interface may be utilized to provide connectivity in geographical areas that are not presently supported by a fixed AP, may be utilized to provide a fail-over communication link, may be utilized for emergency communications, may be utilized to subscribe to local infrastructure access, etc. The cellular network interface may also, for example, be utilized to allow the deployment of solutions that are dependent on the cellular network operators.

An OBU, in accordance with various aspects of the present disclosure, may for example comprise a smart Wi-Fi connection manager that can select the best available wireless link(s) (e.g., Wi-Fi, 802.11p, cellular, vehicle mesh, etc.) with which to access the Internet. The OBU may also, for example, provide geo-location capabilities (e.g., GPS, etc.), motion detection sensors to determine if the vehicle is in motion, and a power control subsystem (e.g., to ensure that the OBU does not deplete the vehicle battery, etc.). The OBU may, for example, comprise any or all of the sensors (e.g., environmental sensors, etc.) discussed herein.

The OBU may also, for example, comprise a manager that manages machine-to-machine data acquisition and transfer (e.g., in a real-time or delay-tolerant fashion) to and from the cloud. For example, the OBU may log and/or communicate information of the vehicles.

The OBU may, for example, comprise a connection and/or routing manager that operates to perform routing of communications in a vehicle-to-vehicle/vehicle-to-infrastructure multi-hop communication. A mobility manager (or controller, MC) may, for example, ensure that communication sessions persist over one or more handoff(s) (also referred to herein as a "handover" or "handovers") (e.g., between different mobile APs, fixed APs, base stations, hot spots, etc.), among different technologies (e.g., 802.11p, cellular, Wi-Fi, satellite, etc.), among different MCs (e.g., in a fail-over scenario, load redistribution scenario, etc.), across different interfaces (or ports), etc. Note that the MC may also be referred to herein as a Local Mobility Anchor (LMA), a Network Controller, etc. Note that the MC, or a plurality thereof, may for example be implemented as part of the backbone, but may also, or alternatively, be implemented as part of any of a variety of components or combinations thereof. For example, the MC may be implemented in a fixed AP (or distributed system thereof), as part of an OBU (or a distributed system thereof), etc. Various non-limiting examples of system components and/or methods are provided in U.S. Provisional Application No. 62/222,098, filed Sep. 22, 2015, and titled "Systems and Method for Managing Mobility in a Network of Moving Things," the entire contents of which are hereby incorporated herein by reference. Note that in an example implementation including a plurality of MCs, such MCs may be co-located and/or may be geographically distributed.

It should be understood that the term "vehicle" includes "autonomous vehicles" and "driver assisted vehicles," as well as any other type of vehicles. For example, a vehicle may be, as examples, and without limitation, a node for use on land and/or under land, watercraft for use on water and/or under water (e.g., boats, ships, speedboats, tugboats, barges, submarines, etc.), aircraft/spacecraft for use in air and/or space (e.g., drones, airplanes, satellites, etc.). The applications within a vehicle may be applicable to the operation of the vehicle, or may be applications used by a passenger in the vehicle. For example, if the vehicle is an autonomously operating bus, in addition to the vast amounts of data needed for the operation of the bus, there may be numerous passengers in the bus that are receiving data (streaming movies, songs, etc.) or transmitting data (uploading videos/pictures, chats, etc.).

Various aspects of the present disclosure also provide a cloud-based service-oriented architecture that handles the real-time management, monitoring and reporting of the network and clients, the functionalities required for data storage, processing and management, the Wi-Fi client authentication and Captive Portal display, etc.

A communication network (or component thereof) in accordance with various aspects of the present disclosure may, for example, support a wide range of smart city applications (or controlled scenarios, or connected scenarios, etc.) and/or use-cases, as described herein.

For example, an example implementation may operate to turn each vehicle (e.g., both public and private taxis, buses, trucks, etc.) into a mobile AP (e.g., a mobile Wi-Fi hotspot), offering Internet access to employees, passengers and mobile users travelling in the city, waiting in bus stops, sitting in parks, etc. Moreover, through an example vehicular mesh network formed between vehicles and/or fleets of vehicles, an implementation may be operable to offload cellular traffic through the mobile Wi-Fi hotspots and/or fixed APs (e.g., 802.11p-based APs) spread over the city and connected to the wired infrastructure of public or private telecom operators in strategic places, while ensuring the widest possible coverage at the lowest possible cost.

An example implementation (e.g., of a communication network and/or components thereof) may, for example, be operable as a massive urban scanner that gathers large amounts of data (e.g., continuously) on-the-move, actionable or not, generated by a myriad of sources spanning from the in-vehicle sensors or On Board Diagnostic System port (e.g., OBD2, etc.), interface with an autonomous vehicle driving system, external Wi-Fi/Bluetooth-enabled sensing units spread over the city, devices of vehicles' drivers and passengers (e.g., information characterizing such devices and/or passengers, etc.), positioning system devices (e.g., position information, velocity information, trajectory information, travel history information, etc.), etc.

Depending on the use case, the OBU may for example process (or computer, transform, manipulate, aggregate, summarize, etc.) the data before sending the data from the vehicle, for example providing the appropriate granularity (e.g., value resolution) and sampling rates (e.g., temporal resolution) for each individual application. For example, the OBU may, for example, process the data in any manner deemed advantageous by the system. The OBU may, for example, send the collected data (e.g., raw data, preprocessed data, information of metrics calculated based on the collected data, etc.) to the Cloud (e.g., to one or more networked servers coupled to any portion of the network) in an efficient and reliable manner to improve the efficiency, environmental impact and social value of municipal city operations and transportation services. Various example use cases are described herein.

In an example scenario in which public buses are moving along city routes and/or taxis are performing their private transportation services, the OBU is able to collect large quantities of real-time data from the positioning systems (e.g., GPS, etc.), from accelerometer modules, etc. The OBU may then, for example, communicate such data to the Cloud, where the data may be processed, reported and viewed, for example to support such public or private bus and/or taxi operations, for example supporting efficient remote monitoring and scheduling of buses and taxis, respectively.

In an example implementation, small cameras (or other sensors) may be coupled to small single-board computers (SBCs) that are placed above the doors of public buses to allow capturing image sequences of people entering and leaving buses, and/or on stops along the bus routes in order to estimate the number of people waiting for a bus. Such data may be gathered by the OBU in order to be sent to the Cloud. With such data, public transportation systems may detect peaks; overcrowded buses, routes and stops; underutilized buses, routes and stops; etc., enabling action to be taken in real-time (e.g., reducing bus periodicity to decrease fuel costs and $CO_2$ emissions where and when passenger flows are smaller, etc.) as well as detecting systematic transportation problems.

An OBU may, for example, be operable to communicate with any of a variety of Wi-Fi-enabled sensor devices equipped with a heterogeneous collection of environmental sensors. Such sensors may, for example, comprise noise sensors (microphones, etc.), gas sensors (e.g., sensing CO, $NO_2$, $O_3$, volatile organic compounds (or VOCs), $CO_2$, etc.), smoke sensors, pollution sensors, meteorological sensors (e.g., sensing temperature, humidity, luminosity, particles, solar radiation, wind speed (e.g., anemometer), wind direction, rain (e.g., a pluviometer), optical scanners, biometric scanners, cameras, microphones, etc.). Such sensors may also comprise sensors associated with users (e.g., vehicle operators or passengers, passersby, etc.) and/or their personal devices (e.g., smart phones or watches, biometrics sensors, wearable sensors, implanted sensors, etc.). Such sensors may, for example, comprise sensors and/or systems associated with on-board diagnostic (OBD) units for vehicles, autonomous vehicle driving systems, etc. Such sensors may, for example, comprise positioning sensors (e.g., GPS sensors, Galileo sensors, GLONASS sensors, etc.). Note that such positioning sensors may be part of a vehicle's operational system (e.g., a local human-controlled vehicle, an autonomous vehicle, a remote human-controlled vehicle, etc.) Such sensors may, for example, comprise container sensors (e.g., garbage can sensors, shipping container sensors, container environmental sensors, container tracking sensors, etc.).

Once a vehicle enters the vicinity of such a sensor device, a wireless link may be established, so that the vehicle (or OBU thereof) can collect sensor data from the sensor device and upload the collected data to a database in the Cloud. The appropriate action can then be taken. In an example waste management implementation, several waste management (or collection) trucks may be equipped with OBUs that are able to periodically communicate with sensors installed on containers in order to gather information about waste level, time passed since last collection, etc. Such information may then sent to the Cloud (e.g., to a waste management application coupled to the Internet, etc.) through the vehicular mesh network, in order to improve the scheduling and/or routing of waste management trucks. Note that various sensors may always be in range of the mobile AP (e.g., vehicle-mounted sensors). Note that the sensor may also (or alternatively) be mobile (e.g., a sensor mounted to another vehicle passing by a mobile AP or fixed AP, a drone-mounted sensor, a pedestrian-mounted sensor, etc.).

In an example implementation, for example in a controlled space (e.g., a port, harbor, airport, factory, plantation, mine, etc.) with many vehicles, machines and employees, a communication network in accordance with various aspects of the present disclosure may expand the wireless coverage of enterprise and/or local Wi-Fi networks, for example without resorting to a Telco-dependent solution based on SIM cards or cellular fees. In such an example scenario, apart from avoiding expensive cellular data plans, limited data rate and poor cellular coverage in some places, a communication network in accordance with various aspects of the present disclosure is also able to collect and/or communicate large amounts of data, in a reliable and real-time manner, where such data may be used to optimize harbor logistics, transportation operations, etc.

For example in a port and/or harbor implementation, by gathering real-time information on the position, speed, fuel consumption and $CO_2$ emissions of the vehicles, the communication network allows a port operator to improve the coordination of the ship loading processes and increase the throughput of the harbor. Also for example, the communication network enables remote monitoring of drivers' behaviors, behaviors of autonomous vehicles and/or control systems thereof, trucks' positions and engines' status, and then be able to provide real-time notifications to drivers (e.g., to turn on/off the engine, follow the right route inside the harbor, take a break, etc.), for example human drivers and/or automated vehicle driving systems, thus reducing the number and duration of the harbor services and trips. Harbor authorities may, for example, quickly detect malfunctioning trucks and abnormal trucks' circulation, thus avoiding accidents in order to increase harbor efficiency, security, and safety. Additionally, the vehicles can also connect to Wi-Fi access points from harbor local operators, and provide Wi-Fi Internet access to vehicles' occupants and surrounding harbor employees, for example allowing pilots to save time by filing reports via the Internet while still on the water.

FIG. 1 shows a block diagram of a communication network 100, in accordance with various aspects of this disclosure. Any or all of the functionality discussed herein may be performed by any or all of the example components of the example network 100. Also, the example network 100 (and/or network components) may, for example, share any or all characteristics with the other example networks (and/or network components) 200, 300, 400, 500-570, and 600, discussed herein.

The example network 100, for example, comprises a Cloud that may, for example comprise any of a variety of network level components. The Cloud may, for example, comprise any of a variety of server systems executing applications that monitor and/or control components of the network 100. Such applications may also, for example, manage the collection of information from any of a large array of networked information sources, many examples of which are discussed herein. The Cloud (or a portion thereof) may also be referred to, at times, as an API. For example, Cloud (or a portion thereof) may provide one or more application programming interfaces (APIs) which other devices may use for communicating/interacting with the Cloud.

An example component of the Cloud may, for example, manage interoperability with various multi-cloud systems and architectures. Another example component (e.g., a Cloud service component) may, for example, provide various cloud services (e.g., captive portal services, authentication, authorization, and accounting (AAA) services, API Gateway services, etc.). An additional example component (e.g., a DevCenter component) may, for example, provide network monitoring and/or management functionality, manage the implementation of software updates, etc. A further example component of the Cloud may manage data storage, data analytics, data access, etc. A still further example component of the Cloud may include any of a variety of third-partly applications and services.

The Cloud may, for example, be coupled to the Backbone/Core Infrastructure of the example network 100 via the Internet (e.g., utilizing one or more Internet Service Providers). Though the Internet is provided by example, it should be understood that scope of the present disclosure is not limited thereto.

The Backbone/Core may, for example, comprise any one or more different communication infrastructure components. For example, one or more providers may provide backbone networks or various components thereof. As shown in the example network 100 illustrated in FIG. 1, a Backbone provider may provide wireline access (e.g., PSTN, fiber, cable, etc.). Also for example, a Backbone provider may provide wireless access (e.g., Microwave, LTE/Cellular, 5G/TV Spectrum, etc.).

The Backbone/Core may also, for example, comprise one or more Local Infrastructure Providers. The Backbone/Core may also, for example, comprise a private infrastructure (e.g., run by the network 100 implementer, owner, etc.). The Backbone/Core may, for example, provide any of a variety of Backbone Services (e.g., AAA, Mobility, Monitoring, Addressing, Routing, Content services, Gateway Control services, etc.).

The Backbone/Core Infrastructure may comprise any of a variety of characteristics, non-limiting examples of which are provided herein. For example, the Backbone/Core may be compatible with different wireless or wired technologies for backbone access. The Backbone/Core may also be adaptable to handle public (e.g., municipal, city, campus, etc.) and/or private (e.g., ports, campus, etc.) network infrastructures owned by different local providers, and/or owned by the network implementer or stakeholder. The Backbone/Core may, for example, comprise and/or interface with different Authentication, Authorization, and Accounting (AAA) mechanisms.

The Backbone/Core Infrastructure may, for example, support different modes of operation (e.g., L2 in port implementations, L3 in on-land public transportation implementations, utilizing any one or more of a plurality of different layers of digital IP networking, any combinations thereof, equivalents thereof, etc.) or addressing pools. The Backbone/Core may also for example, be agnostic to the Cloud provider(s) and/or Internet Service Provider(s). Additionally for example, the Backbone/Core may be agnostic to requests coming from any or all subsystems of the network 100 (e.g., mobile APs or OBUs (On Board Units), fixed APs or RSUs (Road Side Units), MCs (Mobility Controllers) or LMAs (Local Mobility Anchors) or Network Controllers, etc.) and/or third-party systems.

The Backbone/Core Infrastructure may, for example, comprise the ability to utilize and/or interface with different data storage/processing systems (e.g., MongoDB, MySql, Redis, etc.). The Backbone/Core Infrastructure may further, for example, provide different levels of simultaneous access to the infrastructure, services, data, etc.

Figure 2:
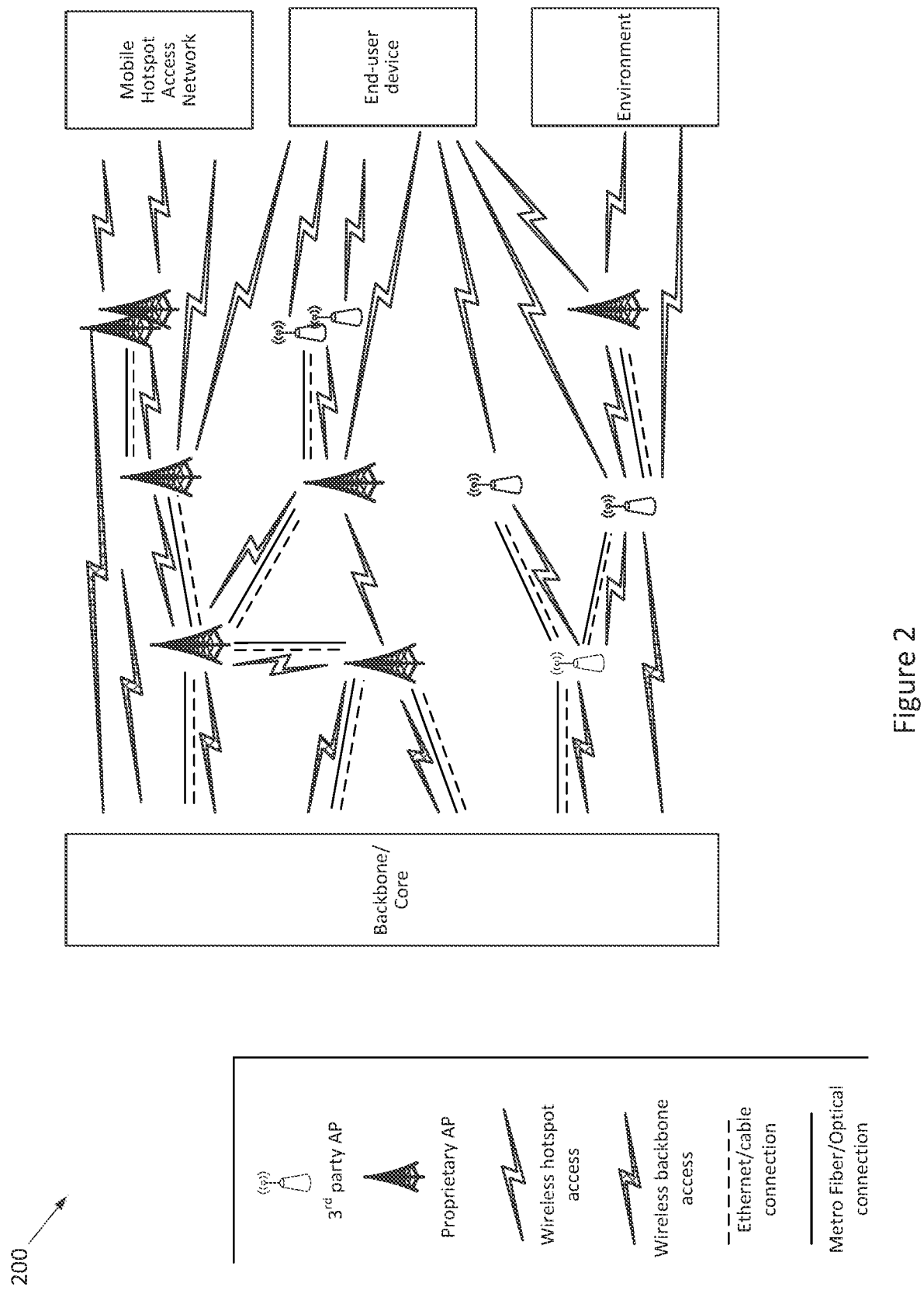
FIG. 2 shows a block diagram of a communication network, in accordance with various aspects of this disclosure.

The example network 100 may also, for example, comprise a Fixed Hotspot Access Network. Various example characteristics of such a Fixed Hotspot Access Network 200 are shown at FIG. 2. The example network 200 may, for example, share any or all characteristics with the other example networks (and/or network components) 100, 300, 400, 500-570, and 600, discussed herein.

In the example network 200, the fixed APs (e.g., the proprietary APs, the public third party APs, the private third party APs, etc.) may be directly connected to the local infrastructure provider and/or to the wireline/wireless backbone. Also for example, the example network 200 may comprise a mesh between the various APs via wireless technologies. Note, however, that various wired technologies may also be utilized depending on the implementation. As shown, different fixed hotspot access networks can be connected to a same backbone provider, but may also be connected to different respective backbone providers. In an example implementation utilizing wireless technology for backbone access, such an implementation may be relatively fault tolerant. For example, a fixed AP may utilize wireless communications to the backbone network (e.g., cellular, 3G, LTE, other wide or metropolitan area networks, etc.) if the backhaul infrastructure is down. Also for example, such an implementation may provide for relatively easy installation (e.g., a fixed AP with no cable power source that can be placed virtually anywhere).

In the example network 200, the same fixed AP can simultaneously provide access to multiple fixed APs, mobile APs (e.g., vehicle OBUs, etc.), devices, user devices, sensors, things, etc. For example, a plurality of mobile hotspot access networks (e.g., OBU-based networks, etc.) may utilize the same fixed AP. Also for example, the same fixed AP can provide a plurality of simultaneous accesses to another single unit (e.g., another fixed AP, mobile AP, device, etc.), for example utilizing different channels, different radios, etc.).

Note that a plurality of fixed APs may be utilized for fault-tolerance/fail-recovery purposes. In an example implementation, a fixed AP and its fail-over AP may both be normally operational (e.g., in a same switch). Also for example, one or more fixed APs may be placed in the network at various locations in an inactive or monitoring mode, and ready to become operational when needed (e.g., in response to a fault, in response to an emergency services need, in response to a data surge, etc.).

Referring back to FIG. 1, the example Fixed Hotspot Access Network is shown with a wireless communication link to a backbone provider (e.g., to one or more Backbone Providers and/or Local Infrastructure Providers), to a Mobile Hotspot Access Network, to one or more End User Devices, and to the Environment. Also, the example Fixed Hotspot Access Network is shown with a wired communication link to one or more Backbone Providers, to the Mobile Hotspot Access Network, to one or more End User Devices, and to the Environment. The Environment may comprise any of a variety of devices (e.g., in-vehicle networks, devices, and sensors; autonomous vehicle networks, devices, and sensors; maritime (or watercraft) and port networks, devices, and sensors; general controlled-space networks, devices, and sensors; residential networks, devices, and sensors; disaster recovery & emergency networks, devices, and sensors; military and aircraft networks, devices, and sensors; smart city networks, devices, and sensors; event (or venue) networks, devices, and sensors; underwater and underground networks, devices, and sensors; agricultural networks, devices, and sensors; tunnel (auto, subway, train, etc.) networks, devices, and sensors; parking networks, devices, and sensors; security and surveillance networks, devices, and sensors; shipping equipment and container networks, devices, and sensors; environmental control or monitoring networks, devices, and sensors; municipal networks, devices, and sensors; waste management networks, devices, and sensors, road maintenance networks, devices, and sensors, traffic management networks, devices, and sensors; advertising networks, devices and sensors; etc.).

Figure 3:
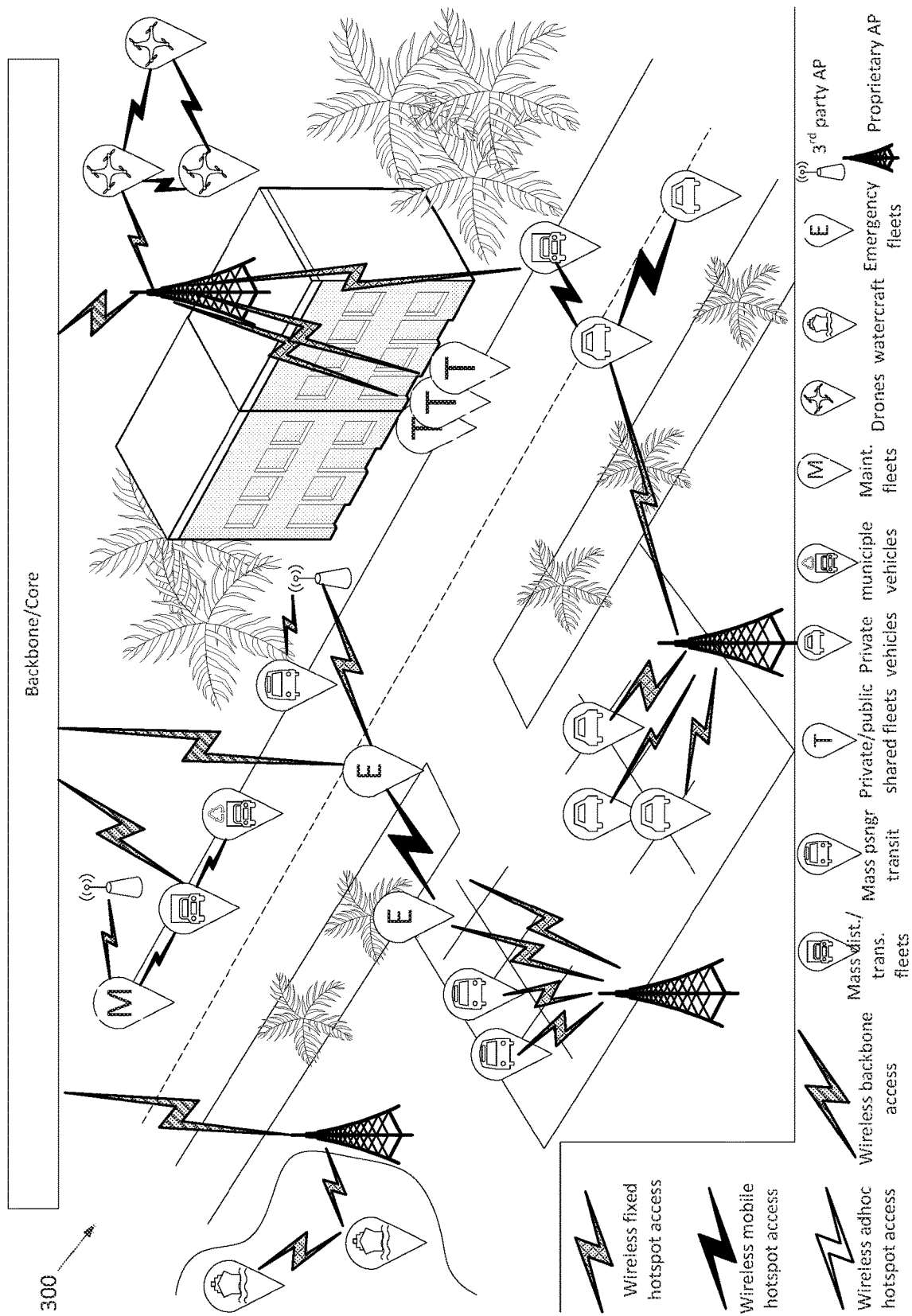
FIG. 3 shows a diagram of a metropolitan area network, in accordance with various aspects of this disclosure.

The example network 100 of FIG. 1 also comprises a Mobile Hotspot Access Network. Various example characteristics of such a Mobile Hotspot Access Network 300 are shown at FIG. 3. Note that various fixed network components (e.g., fixed APs) are also illustrated. The example network 300 may, for example, share any or all characteristics with the other example networks (and/or network components) 100, 200, 400, 500-570, and 600, discussed herein.

The example network 300 comprises a wide variety of mobile APs (or hotspots) that provide access to user devices, provide for sensor data collection, provide multi-hop connectivity to other mobile APs, etc. For example, the example network 300 comprises vehicles from different fleets (e.g., aerial, terrestrial, underground, (under)water, etc.). For example, the example network 300 comprises one or more mass distribution/transportation fleets, one or more mass passenger transportation fleets, private/public shared-user fleets, private vehicles, urban and municipal fleets, maintenance fleets, drones, watercraft (e.g., boats, ships, speedboats, tugboats, barges, etc.), emergency fleets (e.g., police, ambulance, firefighter, etc.), etc.

The example network 300, for example, shows vehicles from different fleets directly connected and/or mesh connected, for example using same or different communication technologies. The example network 300 also shows fleets simultaneously connected to different fixed APs, which may or may not belong to different respective local infrastructure providers. As a fault-tolerance mechanism, the example network 300 may for example comprise the utilization of long-range wireless communication network (e.g., cellular, 3G, 4G, LTE, etc.) in vehicles if the local network infrastructure is down or otherwise unavailable. A same vehicle (e.g., mobile AP or OBU) can simultaneously provide access to multiple vehicles, devices, things, etc., for example using a same communication technology (e.g., shared channels and/or different respective channels thereof) and/or using a different respective communication technology for each. Also for example, a same vehicle can provide multiple accesses to another vehicle, device, thing, etc., for example using a same communication technology (e.g., shared channels and/or different respective channels thereof, and/or using a different communication technology).

Additionally, multiple network elements may be connected together to provide for fault-tolerance or fail recovery, increased throughput, or to achieve any or a variety of a client's networking needs, many of examples of which are provided herein. For example, two mobile APs (or OBUs) may be installed in a same vehicle, etc.

Referring back to FIG. 1, the example Mobile Hotspot Access Network is shown with a wireless communication link to a backbone provider (e.g., to one or more Backbone Providers and/or Local Infrastructure Providers), to a Fixed Hotspot Access Network, to one or more End User Device, and to the Environment (e.g., to any one of more of the sensors or systems discussed herein, any other device or machine, etc.). Though the Mobile Hotspot Access Network is not shown having a wired link to the various other components, there may (at least at times) be such a wired link, at least temporarily.

Figure 4:
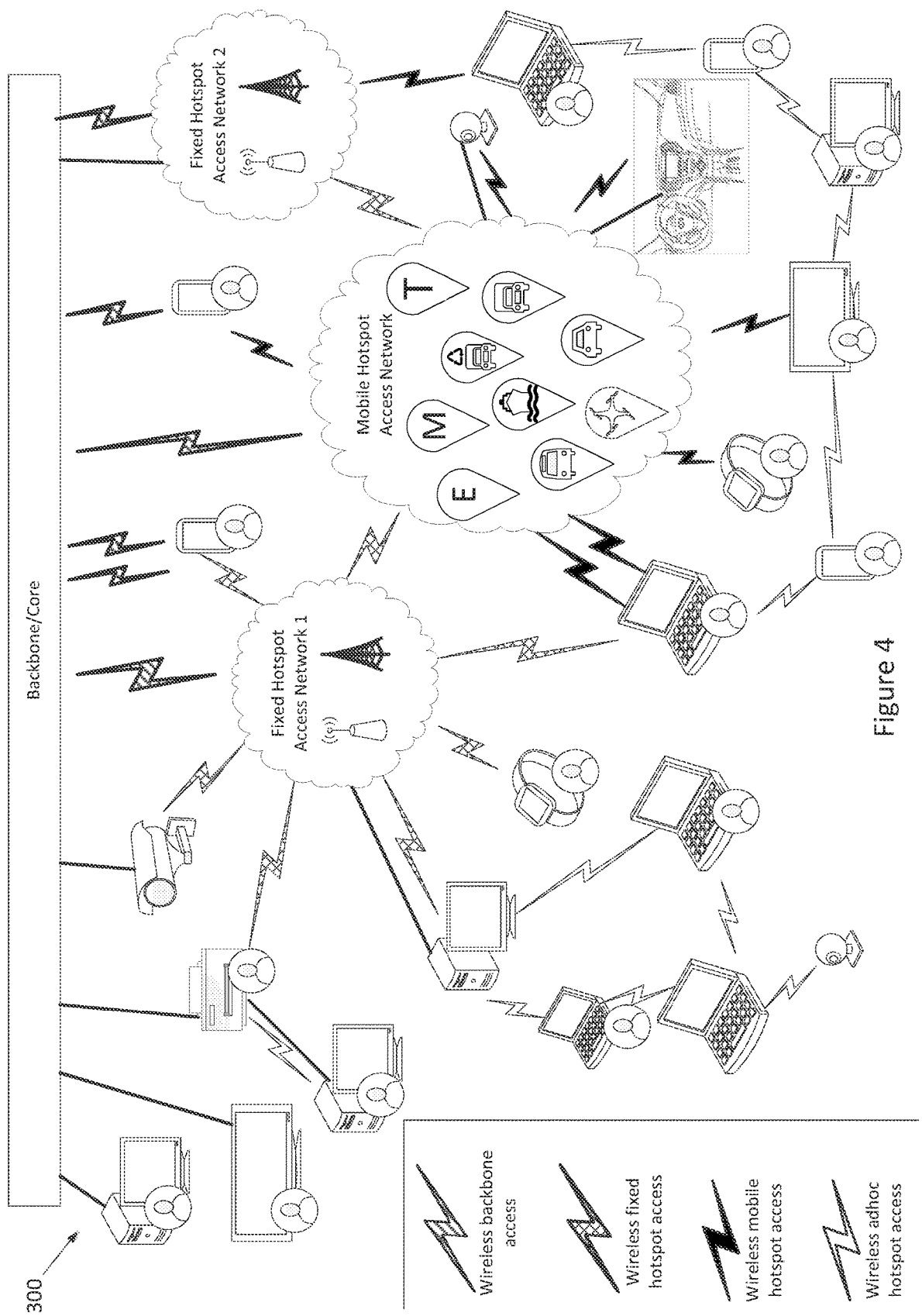
FIG. 4 shows a block diagram of a communication network, in accordance with various aspects of this disclosure.

The example network 100 of FIG. 1 also comprises a set of End-User Devices. Various example end user devices are shown at FIG. 4. Note that various other network components (e.g., Fixed Hotspot Access Networks, Mobile Hotspot Access Network(s), the Backbone/Core, etc.) are also illustrated. The example network 400 may, for example, share any or all characteristics with the other example networks (and/or network components) 100, 200, 300, 500-570, and 600, discussed herein.

The example network 400 shows various mobile networked devices. Such network devices may comprise end-user devices (e.g., smartphones, tablets, smartwatches, laptop computers, webcams, personal gaming devices, personal navigation devices, personal media devices, personal cameras, health-monitoring devices, personal location devices, monitoring panels, printers, etc.). Such networked devices may also comprise any of a variety of devices operating in the general environment, where such devices might not for example be associated with a particular user (e.g. any or all of the sensor devices discussed herein, vehicle sensors, municipal sensors, fleet sensors road sensors, environmental sensors, security sensors, traffic sensors, waste sensors, meteorological sensors, any of a variety of different types of municipal or enterprise equipment, etc.). Any of such networked devices can be flexibly connected to distinct backbone, fixed hotspot access networks, mobile hotspot access networks, etc., using the same or different wired/wireless technologies.

A mobile device may, for example, operate as an AP to provide simultaneous access to multiple devices/things, which may then form ad hoc networks, interconnecting devices ultimately connected to distinct backbone networks, fixed hotspot, and/or mobile hotspot access networks. Devices (e.g., any or all of the devices or network nodes discussed herein) may, for example, have redundant technologies to access distinct backbone, fixed hotspot, and/or mobile hotspot access networks, for example for fault-tolerance and/or load-balancing purposes (e.g., utilizing multiple SIM cards, etc.). A device may also, for example, simultaneously access distinct backbone, fixed hotspot access networks, and/or mobile hotspot access networks, belonging to the same provider or to different respective providers. Additionally for example, a device can provide multiple accesses to another device/thing (e.g., via different channels, radios, etc.).

Referring back to FIG. 1, the example End-User Devices are shown with a wireless communication link to a backbone provider (e.g., to one or more Backbone Providers and/or Local Infrastructure Providers), to a Fixed Hotspot Access Network, to a Mobile Hotspot Access Network, and to the Environment. Also for example, the example End-User Devices are shown with a wired communication link to a backbone provider, to a Fixed Hotspot Access Network, to a Mobile Hotspot Access Network, and to the Environment.

Figure 5A:
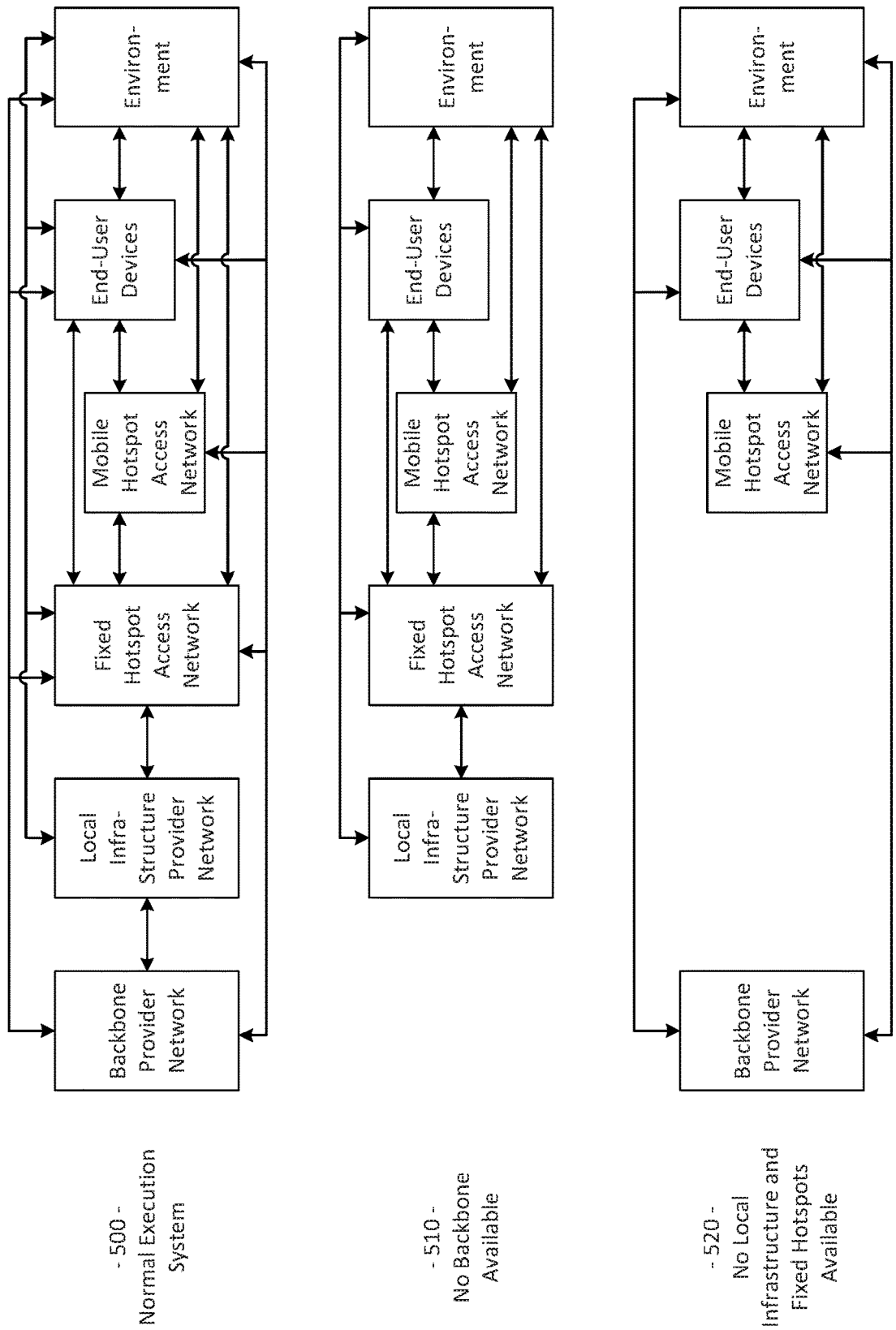
FIGS. 5A-5C show a plurality of network configurations illustrating the flexibility and/or and resiliency of a communication network, in accordance with various aspects of this disclosure.
Figure 5B:
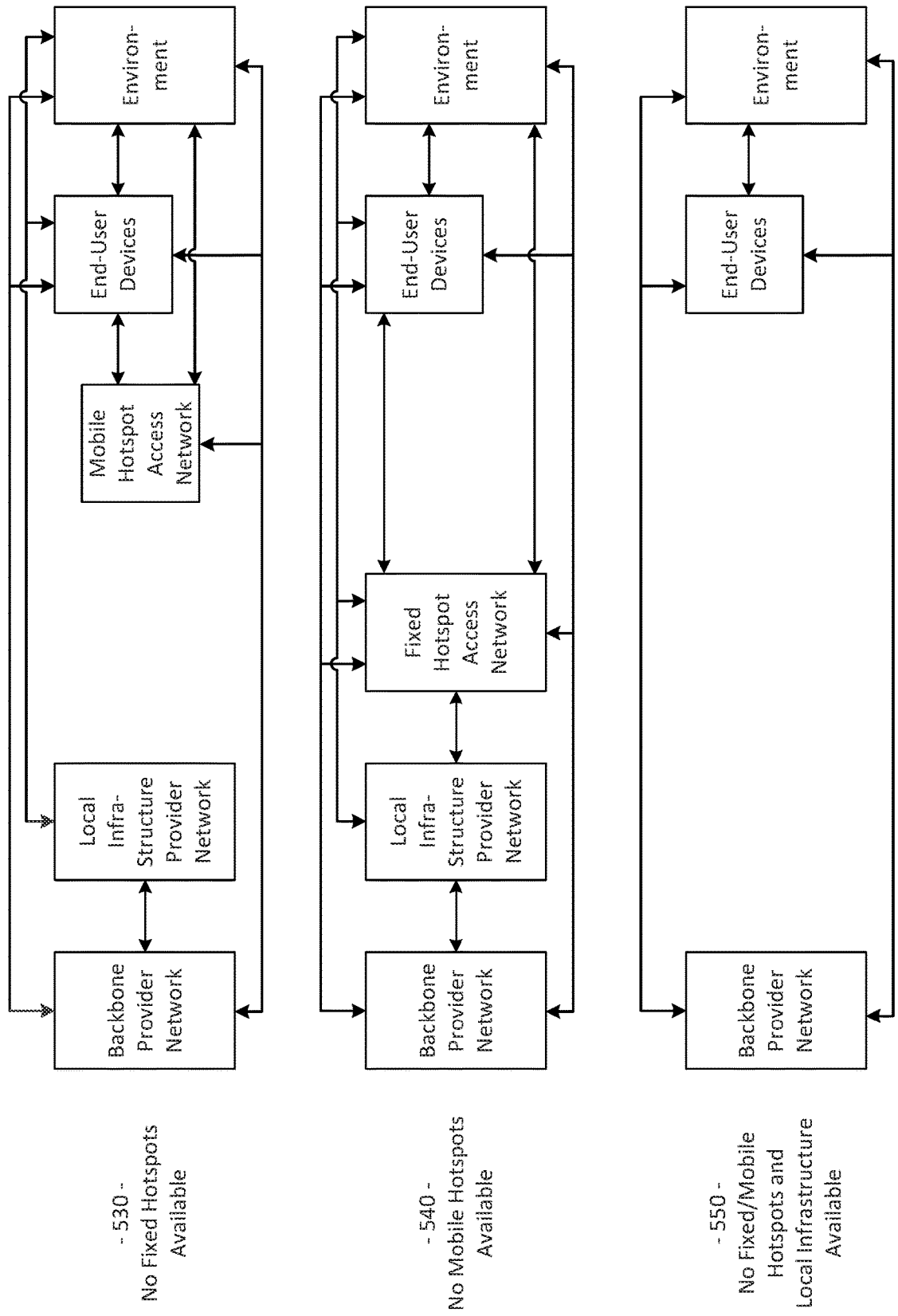
Figure 5C:
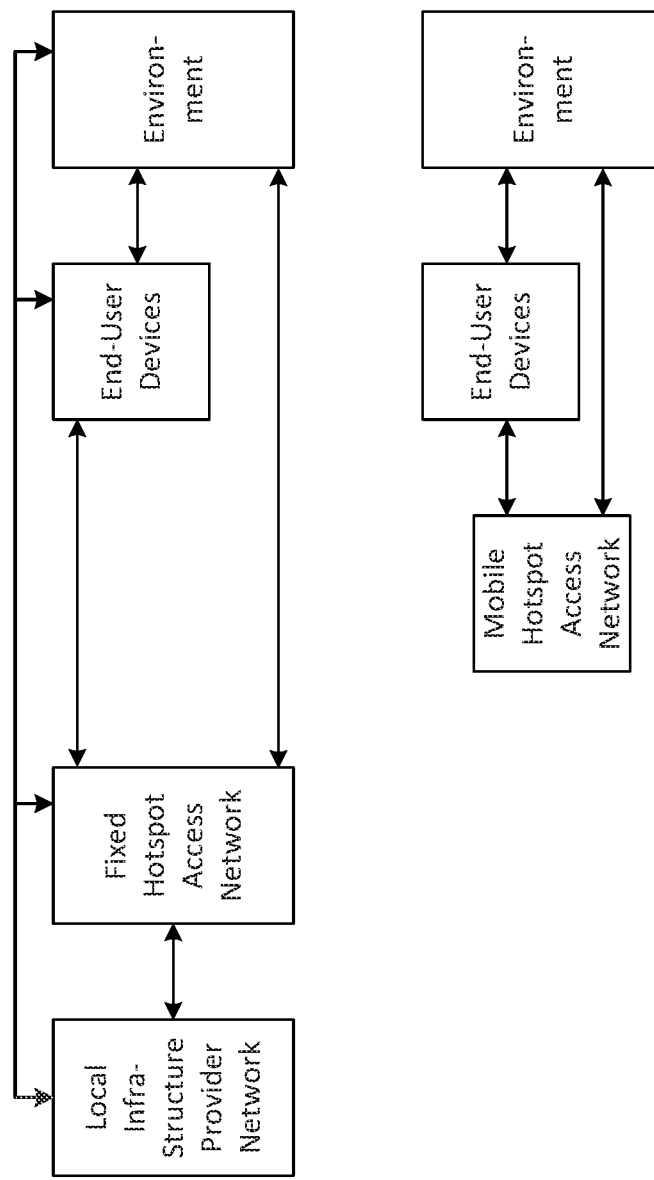

The example network 100 illustrated in FIG. 1 has a flexible architecture that is adaptable at implementation time (e.g., for different use cases) and/or adaptable in real-time, for example as network components enter and leave service. FIGS. 5A-5C illustrate such flexibility by providing example modes (or configurations). The example networks 500-570 may, for example, share any or all characteristics with the other example networks (and/or network components) 100, 200, 300, 400, 600, and 700, discussed herein. For example and without limitation, any or all of the communication links (e.g., wired links, wireless links, etc.) shown in the example networks 500-570 are generally analogous to similarly positioned communication links shown in the example network 100 of FIG. 1.

For example, various aspects of this disclosure provide communication network architectures, systems, and methods for supporting a dynamically configurable communication network comprising a complex array of both static and moving communication nodes (e.g., the Internet of moving things). For example, a communication network implemented in accordance with various aspects of the present disclosure may operate in one of a plurality of modalities comprising various fixed nodes, mobile nodes, and/or a combination thereof, which are selectable to yield any of a variety of system goals (e.g., increased throughput, reduced latency and packet loss, increased availability and robustness of the system, extra redundancy, increased responsiveness, increased security in the transmission of data and/or control packets, reduced number of configuration changes by incorporating smart thresholds (e.g., change of technology, change of certificate, change of IP, etc.), providing connectivity in dead zones or zones with difficult access, reducing the costs for maintenance and accessing the equipment for updating/upgrading, etc.). At least some of such modalities may, for example, be entirely comprised of fixed-position nodes, at least temporarily if not permanently.

For illustrative simplicity, many of the example aspects shown in the example system or network 100 of FIG. 1 (and other Figures herein) are omitted from FIGS. 5A-5C, but may be present. For example, the Cloud, Internet, and ISP aspects shown in FIG. 1 and in other Figures are not explicitly shown in FIGS. 5A-5C, but may be present in any of the example configurations (e.g., as part of the backbone provider network or coupled thereto, as part of the local infrastructure provider network or coupled thereto, etc.).

For example, the first example mode 500 is presented as a normal execution mode, for example a mode (or configuration) in which all of the components discussed herein are present. For example, the communication system in the first example mode 500 comprises a backbone provider network, a local infrastructure provider network, a fixed hotspot access network, a mobile hotspot access network, end-user devices, and environment devices.

As shown in FIG. 5A, and in FIG. 1 in more detail, the backbone provider network may be communicatively coupled to any or all of the other elements present in the first example mode 500 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via a wired link. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the first example mode 500 (or configuration) via one or more wireless links (e.g., RF link, non-tethered optical link, etc.). For example, the backbone provider network may be communicatively coupled to the fixed hotspot access network (or any component thereof), the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

Though not shown in the first example mode 500 (or any of the example modes of FIGS. 5A-5C), one or more servers may be communicatively coupled to the backbone provider network and/or the local infrastructure network. FIG. 1 provides an example of cloud servers being communicatively coupled to the backbone provider network via the Internet.

As additionally shown in FIG. 5A, and in FIG. 1 in more detail, the local infrastructure provider network may be communicatively coupled to any or all of the other elements present in the first example mode 500 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the first example mode 500 (or configuration) via one or more wireless links (e.g., RF link, non-tethered optical link, etc.). For example, the local infrastructure provider network may be communicatively coupled to the backbone provider network (or any component thereof), the fixed hotspot access network (or any component thereof), the mobile hotspot access network (or any component thereof), the end-user devices, and/or environment devices via one or more wireless links. Note that the communication link shown in the first example mode 500 of FIG. 5A between the local infrastructure provider network and the fixed hotspot access network may be wired and/or wireless.

The fixed hotspot access network is also shown in the first example mode 500 to be communicatively coupled to the mobile hotspot access network, the end-user devices, and/or environment devices via one or more wireless links. Many examples of such wireless coupling are provided herein. Additionally, the mobile hotspot access network is further shown in the first example mode 500 to be communicatively coupled to the end-user devices and/or environment devices via one or more wireless links. Many examples of such wireless coupling are provided herein. Further, the end-user devices are also shown in the first example mode 500 to be communicatively coupled to the environment devices via one or more wireless links. Many examples of such wireless coupling are provided herein. Note that in various example implementations any of such wireless links may instead (or in addition) comprise a wired (or tethered) link.

In the first example mode 500 (e.g., the normal mode), information (or data) may be communicated between an end-user device and a server (e.g., a computer system) via the mobile hotspot access network, the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network, the local infrastructure provider network, and/or the backbone provider network (e.g., skipping the mobile hotspot access network). Also for example, information communicated between an end user device and a server may be communicated via the backbone provider network (e.g., skipping the mobile hotspot access network, fixed hotspot access network, and/or local infrastructure provider network).

Similarly, in the first example mode 500 (e.g., the normal mode), information (or data) may be communicated between an environment device and a server via the mobile hotspot access network, the fixed hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network, the local infrastructure provider network, and/or the backbone provider network (e.g., skipping the mobile hotspot access network). Also for example, information communicated between an environment device and a server may be communicated via the backbone provider network (e.g., skipping the mobile hotspot access network, fixed hotspot access network, and/or local infrastructure provider network). Additionally for example, information communicated between an environment device and a server may be communicated via the local infrastructure provider network (e.g., skipping the mobile hotspot access network and/or fixed hotspot access network).

As discussed herein, the example networks presented herein are adaptively configurable to operate in any of a variety of different modes (or configurations). Such adaptive configuration may occur at initial installation and/or during subsequent controlled network evolution (e.g., adding or removing any or all of the network components discussed herein, expanding or removing network capacity, adding or removing coverage areas, adding or removing services, etc.). Such adaptive configuration may also occur in real-time, for example in response to real-time changes in network conditions (e.g., networks or components thereof being available or not based on vehicle or user-device movement, network or component failure, network or component replacement or augmentation activity, network overloading, etc.). The following example modes are presented to illustrate characteristics of various modes in which a communication system may operate in accordance with various aspects of the present disclosure. The following example modes will generally be discussed in relation to the first example mode 500 (e.g., the normal execution mode). Note that such example modes are merely illustrative and not limiting.

The second example mode (or configuration) 510 (e.g., a no backbone available mode) may, for example, share any or all characteristics with the first example mode 500, albeit without the backbone provider network and communication links therewith. For example, the communication system in the second example mode 510 comprises a local infrastructure provider network, a fixed hotspot access network, a mobile hotspot access network, end-user devices, and environment devices.

As shown in FIG. 5A, and in FIG. 1 in more detail, the local infrastructure provider network may be communicatively coupled to any or all of the other elements present in the second example mode 510 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the second example mode 510 (or configuration) via one or more wireless links (e.g., RF link, non-tethered optical link, etc.). For example, the local infrastructure provider network may be communicatively coupled to the fixed hotspot access network (or any component thereof), the mobile hotspot access network (or any component thereof), the end-user devices, and/or environment devices via one or more wireless links. Note that the communication link(s) shown in the second example mode 510 of FIG. 5A between the local infrastructure provider network and the fixed hotspot access network may be wired and/or wireless.

The fixed hotspot access network is also shown in the second example mode 510 to be communicatively coupled to the mobile hotspot access network, the end-user devices, and/or environment devices via one or more wireless links. Many examples of such wireless coupling are provided herein. Additionally, the mobile hotspot access network is further shown in the second example mode 510 to be communicatively coupled to the end-user devices and/or environment devices via one or more wireless links. Many examples of such wireless coupling are provided herein. Further, the end-user devices are also shown in the second example mode 510 to be communicatively coupled to the environment devices via one or more wireless links. Many examples of such wireless coupling are provided herein. Note that in various example implementations any of such wireless links may instead (or in addition) comprise a wired (or tethered) link.

In the second example mode 510 (e.g., the no backbone available mode), information (or data) may be communicated between an end-user device and a server (e.g., a computer, etc.) via the mobile hotspot access network, the fixed hotspot access network, and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network and/or the local infrastructure provider network (e.g., skipping the mobile hotspot access network). Also for example, information communicated between an end user device and a server may be communicated via the local infrastructure provider network (e.g., skipping the mobile hotspot access network and/or fixed hotspot access network).

Similarly, in the second example mode 510 (e.g., the no backbone available mode), information (or data) may be communicated between an environment device and a server via the mobile hotspot access network, the fixed hotspot access network, and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network and/or the local infrastructure provider network (e.g., skipping the mobile hotspot access network). Also for example, information communicated between an environment device and a server may be communicated via the local infrastructure provider network (e.g., skipping the mobile hotspot access network and/or fixed hotspot access network).

The second example mode 510 may be utilized for any of a variety of reasons, non-limiting examples of which are provided herein. For example, due to security and/or privacy goals, the second example mode 510 may be utilized so that communication access to the public Cloud systems, the Internet in general, etc., is not allowed. For example, all network control and management functions may be within the local infrastructure provider network (e.g., wired local network, etc.) and/or the fixed access point network.

In an example implementation, the communication system might be totally owned, operated and/or controlled by a local port authority. No extra expenses associated with cellular connections need be spent. For example, cellular connection capability (e.g., in mobile APs, fixed APs, end user devices, environment devices, etc.) need not be provided. Note also that the second example mode 510 may be utilized in a scenario in which the backbone provider network is normally available but is currently unavailable (e.g., due to server failure, due to communication link failure, due to power outage, due to a temporary denial of service, etc.).

The third example mode (or configuration) 520 (e.g., a no local infrastructure and fixed hotspots available mode) may, for example, share any or all characteristics with the first example mode 500, albeit without the local infrastructure provider network, the fixed hotspot access network, and communication links therewith. For example, the communication system in the third example mode 520 comprises a backbone provider network, a mobile hotspot access network, end-user devices, and environment devices.

As shown in FIG. 5A, and in FIG. 1 in more detail, the backbone provider network may be communicatively coupled to any or all of the other elements present in the third example mode 520 (or configuration) via one or more wired (or tethered) links. For example, the backbone provider network may be communicatively coupled to the end-user devices and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the third example mode 520 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links.

The mobile hotspot access network is further shown in the third example mode 520 to be communicatively coupled to the end-user devices and/or environment devices via one or more wireless links. Many examples of such wireless coupling are provided herein. Further, the end-user devices are also shown in the third example mode 520 to be communicatively coupled to the environment devices via one or more wireless links. Many examples of such wireless coupling are provided herein. Note that in various example implementations any of such wireless links may instead (or in addition) comprise a wired (or tethered) link.

In the third example mode 520 (e.g., the no local infrastructure and fixed hotspots available mode), information (or data) may be communicated between an end-user device and a server (e.g., a computer, etc.) via the mobile hotspot access network and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the backbone provider network (e.g., skipping the mobile hotspot access network).

Similarly, in the third example mode 520 (e.g., the no local infrastructure and fixed hotspots available mode), information (or data) may be communicated between an environment device and a server via the mobile hotspot access network and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the backbone provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the backbone provider network (e.g., skipping the mobile hotspot access network).

In the third example mode 520, all control/management functions may for example be implemented within the Cloud. For example, since the mobile hotspot access network does not have a communication link via a fixed hotspot access network, the mobile APs may utilize a direct connection (e.g., a cellular connection) with the backbone provider network (or Cloud). If a mobile AP does not have such capability, the mobile AP may also, for example, utilize data access provided by the end-user devices communicatively coupled thereto (e.g., leveraging the data plans of the end-user devices).

The third example mode 520 may be utilized for any of a variety of reasons, non-limiting examples of which are provided herein. In an example implementation, the third example mode 520 may be utilized in an early stage of a larger deployment, for example deployment that will grow into another mode (e.g., the example first mode 500, example fourth mode 530, etc.) as more communication system equipment is installed. Note also that the third example mode 520 may be utilized in a scenario in which the local infrastructure provider network and fixed hotspot access network are normally available but are currently unavailable (e.g., due to equipment failure, due to communication link failure, due to power outage, due to a temporary denial of service, etc.).

The fourth example mode (or configuration) 530 (e.g., a no fixed hotspots available mode) may, for example, share any or all characteristics with the first example mode 500, albeit without the fixed hotspot access network and communication links therewith. For example, the communication system in the fourth example mode 530 comprises a backbone provider network, a local infrastructure provider network, a mobile hotspot access network, end-user devices, and environment devices.

As shown in FIG. 5B, and in FIG. 1 in more detail, the backbone provider network may be communicatively coupled to any or all of the other elements present in the fourth example mode 530 (or configuration) via one or more wired (or tethered) links. For example, the backbone provider network may be communicatively coupled to the local infrastructure provider network (or any component thereof), the end-user devices, and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5B, and in FIG. 1 in more detail, the backbone provider network may be communicatively coupled to any or all of the other elements present in the fourth example mode 530 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fourth example mode 530 (or configuration) via one or more wired (or tethered) links. For example, the local infrastructure provider network may be communicatively coupled to the backbone provider network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fourth example mode 530 (or configuration) via one or more wireless links (e.g., RF link, non-tethered optical link, etc.). For example, the local infrastructure provider network may be communicatively coupled to the backbone provider network (or any component thereof), the mobile hotspot access network (or any component thereof), the end-user devices, and/or environment devices via one or more wireless links.

The mobile hotspot access network is further shown in the fourth example mode 530 to be communicatively coupled to the end-user devices and/or environment devices via one or more wireless links. Many examples of such wireless coupling are provided herein. Further, the end-user devices are also shown in the fourth example mode 530 to be communicatively coupled to the environment devices via one or more wireless links. Many examples of such wireless coupling are provided herein.

In the fourth example mode 530 (e.g., the no fixed hotspots mode), information (or data) may be communicated between an end-user device and a server via the mobile hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network and/or the backbone provider network (e.g., skipping the mobile hotspot access network). Also for example, information communicated between an end user device and a server may be communicated via the backbone provider network (e.g., skipping the mobile hotspot access network and/or local infrastructure provider network).

Similarly, in the fourth example mode 530 (e.g., the no fixed hotspots available mode), information (or data) may be communicated between an environment device and a server via the mobile hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the mobile hotspot access network). Also for example, information communicated between an environment device and a server may be communicated via the backbone provider network (e.g., skipping the mobile hotspot access network and/or local infrastructure provider network). Additionally for example, information communicated between an environment device and a server may be communicated via the local infrastructure provider network (e.g., skipping the mobile hotspot access network and/or backbone provider network).

In the fourth example mode 530, in an example implementation, some of the control/management functions may for example be implemented within the local backbone provider network (e.g., within a client premises). For example, communication to the local infrastructure provider may be performed through the backbone provider network (or Cloud). Note that in a scenario in which there is a direct communication pathway between the local infrastructure provider network and the mobile hotspot access network, such communication pathway may be utilized.

For example, since the mobile hotspot access network does not have a communication link via a fixed hotspot access network, the mobile APs may utilize a direct connection (e.g., a cellular connection) with the backbone provider network (or Cloud). If a mobile AP does not have such capability, the mobile AP may also, for example, utilize data access provided by the end-user devices communicatively coupled thereto (e.g., leveraging the data plans of the end-user devices).

The fourth example mode 530 may be utilized for any of a variety of reasons, non-limiting examples of which are provided herein. In an example implementation, the fourth example mode 530 may be utilized in an early stage of a larger deployment, for example a deployment that will grow into another mode (e.g., the example first mode 500, etc.) as more communication system equipment is installed. The fourth example mode 530 may, for example, be utilized in a scenario in which there is no fiber (or other) connection available for fixed APs (e.g., in a maritime scenario, in a plantation scenario, etc.), or in which a fixed AP is difficult to access or connect. For example, one or more mobile APs of the mobile hotspot access network may be used as gateways to reach the Cloud. The fourth example mode 530 may also, for example, be utilized when a vehicle fleet and/or the mobile APs associated therewith are owned by a first entity and the fixed APs are owned by another entity, and there is no present agreement for communication between the mobile APs and the fixed APs. Note also that the fourth example mode 530 may be utilized in a scenario in which the fixed hotspot access network is normally available but are currently unavailable (e.g., due to equipment failure, due to communication link failure, due to power outage, due to a temporary denial of service, etc.).

The fifth example mode (or configuration) 540 (e.g., a no mobile hotspots available mode) may, for example, share any or all characteristics with the first example mode 500, albeit without the mobile hotspot access network and communication links therewith. For example, the communication system in the fifth example mode 540 comprises a backbone provider network, a local infrastructure provider network, a fixed hotspot access network, end-user devices, and environment devices.

As shown in FIG. 5B, and in FIG. 1 in more detail, the backbone provider network may be communicatively coupled to any or all of the other elements present in the fifth example mode 540 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via one or more wired links. Note that such a wired coupling may be temporary.

Also shown in FIG. 5B, and in FIG. 1 in more detail, the backbone provider network may be communicatively coupled to any or all of the other elements present in the fifth example mode 540 (or configuration) via one or more wireless links (e.g., RF link, non-tethered optical link, etc.). For example, the backbone provider network may be communicatively coupled to the fixed hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fifth example mode 540 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fifth example mode 540 (or configuration) via one or more wireless links (e.g., RF link, non-tethered optical link, etc.). For example, the local infrastructure provider network may be communicatively coupled to the backbone provider network, the fixed hotspot access network (or any component thereof), the end-user devices, and/or environment devices via one or more wireless links. Note that the communication link(s) shown in the fifth example mode 540 of FIG. 5B between the local infrastructure provider network and the fixed hotspot access network may be wired and/or wireless.

The fixed hotspot access network is also shown in the fifth example mode 540 to be communicatively coupled to the end-user devices and/or environment devices via one or more wireless links. Many examples of such wireless coupling are provided herein. Further, the end-user devices are also shown in the fifth example mode 540 to be communicatively coupled to the environment devices via one or more wireless links. Many examples of such wireless coupling are provided herein.

In the fifth example mode 540 (e.g., the no mobile hotspots available mode), information (or data) may be communicated between an end-user device and a server via the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network, and/or the backbone provider network (e.g., skipping the fixed hotspot access network). Also for example, information communicated between an end user device and a server may be communicated via the backbone provider network (e.g., skipping the fixed hotspot access network and/or local infrastructure provider network).

Similarly, in the fifth example mode 540 (e.g., the no mobile hotspots available mode), information (or data) may be communicated between an environment device and a server via the fixed hotspot access network, the local infrastructure provider network, and/or the backbone provider network. Also for example, an environment device may communicate with or through an end-user device (e.g., instead of or in addition to the fixed hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the fixed hotspot access network). Also for example, information communicated between an environment device and a server may be communicated via the backbone provider network (e.g., skipping the fixed hotspot access network and/or local infrastructure provider network). Additionally for example, information communicated between an environment device and a server may be communicated via the local infrastructure provider network (e.g., skipping the fixed hotspot access network and/or the backbone provider network).

In the fifth example mode 540, in an example implementation, the end-user devices and environment devices may communicate directly to fixed APs (e.g., utilizing Ethernet, Wi-Fi, etc.). Also for example, the end-user devices and/or environment devices may communicate directly with the backbone provider network (e.g., utilizing cellular connections, etc.).

The fifth example mode 540 may be utilized for any of a variety of reasons, non-limiting examples of which are provided herein. In an example implementation in which end-user devices and/or environment devices may communicate directly with fixed APs, such communication may be utilized instead of mobile AP communication. For example, the fixed hotspot access network might provide coverage for all desired areas.

Note also that the fifth example mode 540 may be utilized in a scenario in which the fixed hotspot access network is normally available but is currently unavailable (e.g., due to equipment failure, due to communication link failure, due to power outage, due to a temporary denial of service, etc.).

The sixth example mode (or configuration) 550 (e.g., the no fixed/mobile hotspots and local infrastructure available mode) may, for example, share any or all characteristics with the first example mode 500, albeit without the local infrastructure provider network, fixed hotspot access network, mobile hotspot access network, and communication links therewith. For example, the communication system in the sixth example mode 550 comprises a backbone provider network, end-user devices, and environment devices.

As shown in FIG. 5B, and in FIG. 1 in more detail, the backbone provider network may be communicatively coupled to any or all of the other elements present in the sixth example mode 550 (or configuration) via one or more wired (or tethered) links. For example, the backbone provider network may be communicatively coupled to the end-user devices and/or environment devices via one or more wired links. Note that such a wired coupling may be temporary.

Also shown in FIG. 5B, and in FIG. 1 in more detail, the backbone provider network may be communicatively coupled to any or all of the other elements present in the sixth example mode 550 (or configuration) via one or more wireless links (e.g., RF link, non-tethered optical link, etc.). For example, the backbone provider network may be communicatively coupled to the end-user devices and/or environment devices via one or more wireless links.

The end-user devices are also shown in the sixth example mode 550 to be communicatively coupled to the environment devices via one or more wireless links. Many examples of such wireless coupling are provided herein.

In the sixth example mode 550 (e.g., the no fixed/mobile hotspots and local infrastructure available mode), information (or data) may be communicated between an end-user device and a server via the backbone provider network. Similarly, in the sixth example mode 550 (e.g., the no fixed/mobile hotspots and local infrastructure mode), information (or data) may be communicated between an environment device and a server via the backbone provider network. Also for example, an environment device may communicate with or through an end-user device (e.g., instead of or in addition to the mobile hotspot access network).

The sixth example mode 550 may be utilized for any of a variety of reasons, non-limiting examples of which are provided herein. In an example implementation, for example in which an end-user has not yet subscribed to the communication system, the end-user device may subscribe to the system through a Cloud application and by communicating directly with the backbone provider network (e.g., via cellular link, etc.). The sixth example mode 550 may also, for example, be utilized in rural areas in which mobile AP presence is sparse, fixed AP installation is difficult or impractical, etc.

Note also that the sixth example mode 550 may be utilized in a scenario in which the infrastructure provider network, fixed hotspot access network, and/or mobile hotspot access network are normally available but are currently unavailable (e.g., due to equipment failure, due to communication link failure, due to power outage, due to a temporary denial of service, etc.).

The seventh example mode (or configuration) 560 (e.g., the no backbone and mobile hotspots available mode) may, for example, share any or all characteristics with the first example mode 500, albeit without the backbone provider network, mobile hotspot access network, and communication links therewith. For example, the communication system in the seventh example mode 560 comprises a local infrastructure provider network, fixed hotspot access network, end-user devices, and environment devices.

As shown in FIG. 5C, and in FIG. 1 in more detail, the local infrastructure provider network may be communicatively coupled to any or all of the other elements present in the seventh example mode 560 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary.

Also, though not explicitly shown, the local infrastructure provider network may be communicatively coupled to any or all of the other elements present in the seventh example mode 560 (or configuration) via one or more wireless links (e.g., RF link, non-tethered optical link, etc.). For example, the local infrastructure provider network may be communicatively coupled to the fixed hotspot access network (or any component thereof), the end-user devices, and/or environment devices via one or more wireless links. Note that the communication link shown in the seventh example mode 560 of FIG. 5C between the local infrastructure provider network and the fixed hotspot access network may be wired and/or wireless.

The fixed hotspot access network is also shown in the seventh example mode 560 to be communicatively coupled to the end-user devices and/or environment devices via one or more wireless links. Many examples of such wireless coupling are provided herein. Additionally, the end-user devices are also shown in the seventh example mode 560 to be communicatively coupled to the environment devices via one or more wireless links. Many examples of such wireless coupling are provided herein.

In the seventh example mode 560 (e.g., the no backbone and mobile hotspots available mode), information (or data) may be communicated between an end-user device and a server via the fixed hotspot access network and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network (e.g., skipping the fixed hotspot access network).

Similarly, in the seventh example mode 560 (e.g., the no backbone and mobile hotspots available mode), information (or data) may be communicated between an environment device and a server via the fixed hotspot access network and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the local infrastructure provider network (e.g., skipping the fixed hotspot access network).

The seventh example mode 560 may be utilized for any of a variety of reasons, non-limiting examples of which are provided herein. In an example controlled space implementation, Cloud access might not be provided (e.g., for security reasons, privacy reasons, etc.), and full (or sufficient) coverage of the coverage area is provided by the fixed hotspot access network, and thus the mobile hotspot access network is not needed. For example, the end-user devices and environment devices may communicate directly (e.g., via Ethernet, Wi-Fi, etc.) with the fixed APs.

Note also that the seventh example mode 560 may be utilized in a scenario in which the backbone provider network and/or fixed hotspot access network are normally available but are currently unavailable (e.g., due to equipment failure, due to communication link failure, due to power outage, due to a temporary denial of service, etc.).

The eighth example mode (or configuration) 570 (e.g., the no backbone, fixed hotspots, and local infrastructure available mode) may, for example, share any or all characteristics with the first example mode 500, albeit without the backbone provider network, local infrastructure provider network, fixed hotspot access network, and communication links therewith. For example, the communication system in the eighth example mode 570 comprises a mobile hotspot access network, end-user devices, and environment devices.

As shown in FIG. 5C, and in FIG. 1 in more detail, the mobile hotspot access network is shown in the eighth example mode 570 to be communicatively coupled to the end-user devices and/or environment devices via one or more wireless links. Many examples of such wireless coupling are provided herein. Further, the end-user devices are also shown in the eighth example mode 570 to be communicatively coupled to the environment devices via one or more wireless links. Many examples of such wireless coupling are provided herein.

In the eighth example mode 570 (e.g., the no backbone, fixed hotspots, and local infrastructure available mode), information (or data) might not (at least currently) be communicated between an end-user device and a server (e.g., a coupled to the backbone provider network, local infrastructure provider network, etc.). Similarly, information (or data) might not (at least currently) be communicated between an environment device and a server (e.g., a coupled to the backbone provider network, local infrastructure provider network, etc.). Note that the environment device may communicate with or through an end-user device (e.g., instead of or in addition to the mobile hotspot access network).

The eighth example mode 570 may be utilized for any of a variety of reasons, non-limiting examples of which are provided herein. In an example implementation, the eighth example mode 570 may be utilized for gathering and/or serving data (e.g., in a delay-tolerant networking scenario), providing peer-to-peer communication through the mobile hotspot access network (e.g., between clients of a single mobile AP, between clients of respective different mobile APs, etc.), etc. In another example scenario, the eighth example mode 570 may be utilized in a scenario in which vehicle-to-vehicle communications are prioritized above vehicle-to-infrastructure communications. In yet another example scenario, the eighth example mode 570 may be utilized in a scenario in which all infrastructure access is lost (e.g., in tunnels, parking garages, etc.).

Note also that the eighth example mode 570 may be utilized in a scenario in which the backbone provider network, local infrastructure provider network, and/or fixed hotspot access network are normally available but are currently unavailable (e.g., due to equipment failure, due to communication link failure, due to power outage, due to a temporary denial of service, etc.).

As shown and discussed herein, it is beneficial to have a generic platform that allows multi-mode communications of multiple users or machines within different environments, using multiple devices with multiple technologies and/or multiple networks, connected to multiple moving/static things with multiple technologies and/or multiple networks, forming wireless (mesh) hotspot networks over different environments, connected to multiple wired/wireless infrastructure/network backbone providers, ultimately connected to the Internet, Cloud or private network infrastructure.

Figure 6:
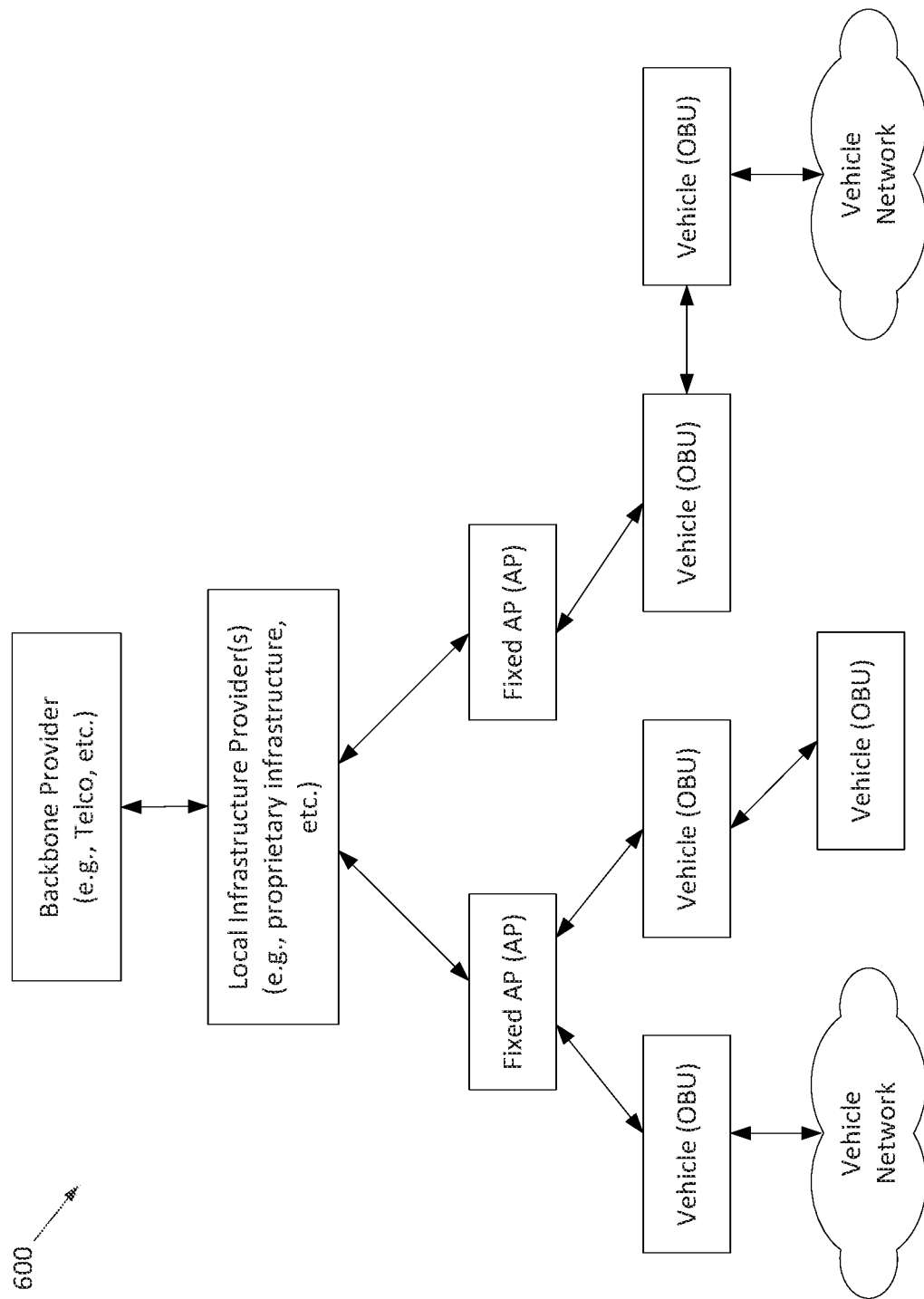
FIG. 6 shows a block diagram of an example communication network, in accordance with various aspects of the present disclosure.

FIG. 6 shows yet another block diagram of an example network configuration, in accordance with various aspects of the present disclosure. The example network 600 may, for example, share any or all characteristics with the other example networks and/or network components 100, 200, 300, 400, 500-570, and 600, discussed herein. Notably, the example network 600 shows a plurality of mobile APs (or OBUs), each communicatively coupled to a fixed AP (or RSU), where each mobile AP may provide network access to a vehicle network (e.g., comprising other vehicles or vehicle networks, user devices, sensor devices, etc.).

In some instances, the various resources and/or capabilities available in networks of moving things (e.g., a vehicle network, a network of or including autonomous vehicles, etc.) may be utilized to optimize operations and/or services in such networks.

Figure 7:
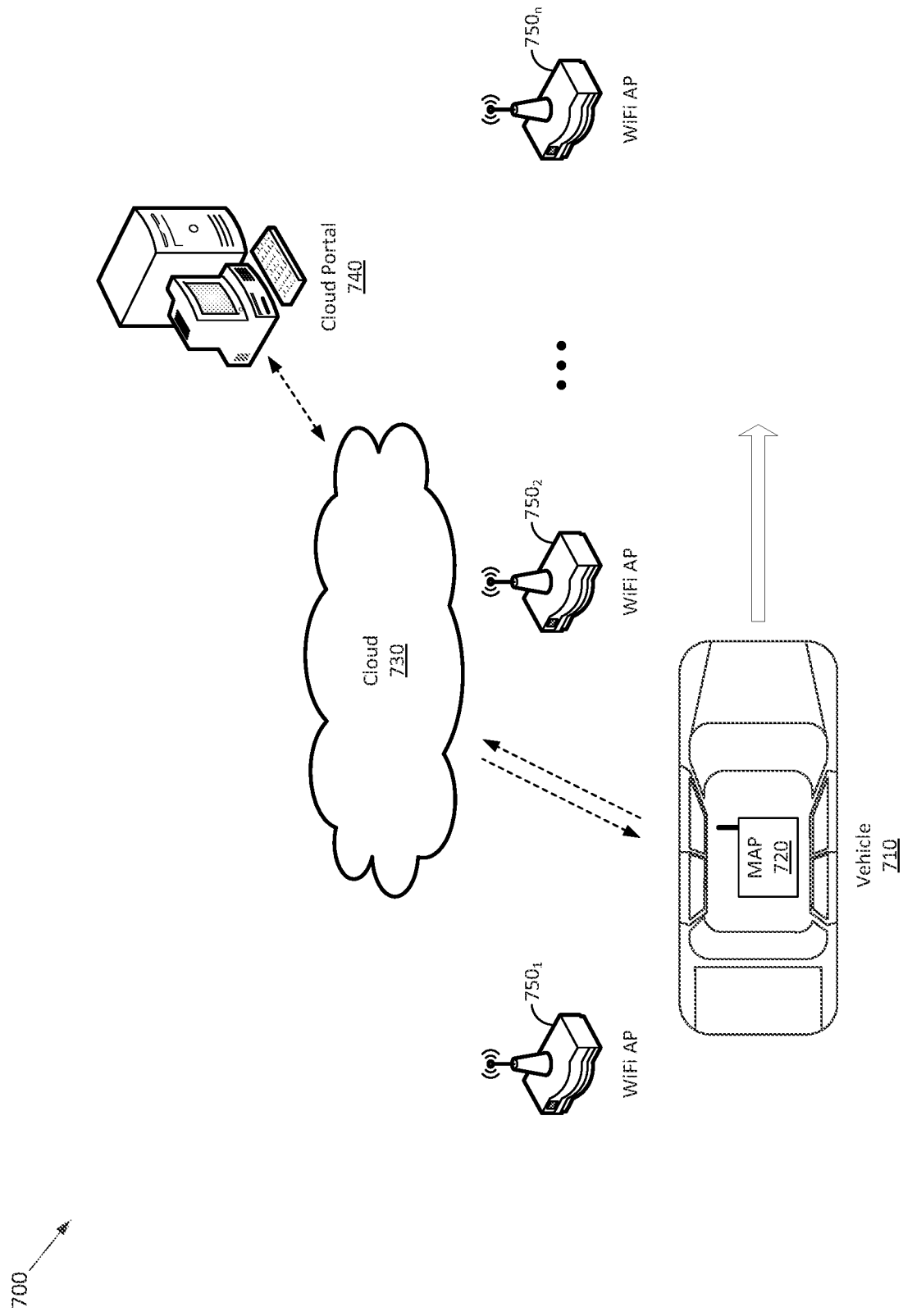
FIG. 7 shows an example communication network supporting intelligent offloading of traffic to public and private Wi-Fi hotspots in a network of moving things, in accordance with various aspects of the present disclosure.

FIG. 7 shows an example communication network supporting intelligent offloading of traffic to public and private Wi-Fi hotspots in a network of moving things, in accordance with various aspects of the present disclosure. Shown in FIG. 7 is an example network 700.

The example network 700 may, for example, share any or all characteristics with the example networks 100, 200, 300, 400, 500-570, and 600 (and/or network components thereof), discussed herein. In this regard, the network 700 may be a network of moving things (e.g., a vehicle network, a network of or including autonomous vehicles, etc.), or at least a portion of such network. As shown in FIG. 7, the example network 700 comprises mobile access points (MAPs), of which MAP 720 deployed in vehicle 710 is shown, configured to provide online access and/or connectivity to Internet/Cloud 730, within a vehicle network (e.g., comprising other vehicles or vehicle networks, user devices, sensor devices, etc.).

The mobile APs may utilize multiple communication technologies and/or interfaces. For example, while not shown in FIG. 7, mobile access points (MAPs), such as the MAP 720, may be communicatively coupled to the Internet/Cloud 730 using DSRC (Dedicated Short Range Communications) based links, such as via fixed access points (FAPs), using cellular based links, such as via a cellular base stations, etc. Further, mobile access points (MAPs), such as the MAP 720, may also support multiple technologies and/or interfaces (e.g., Wi-Fi, Ethernet, etc.), and/or connectivity using multiple networks (e.g., corresponding to the same type or types of technologies or network interfaces), with the vehicle networks serviced by these mobile APs.

In some instances, characteristics of communication networks like the network 700, such as mobility of certain elements therein (e.g., the mobile APs), and availability of the Internet/Cloud 730 and connectivity thereto, as well as availability of processing, storage, and communicative resources in various elements in the networks, may be used in providing services that may not otherwise be available, and/or may be used in optimizing such services. For example, the availability of processing, storage, and communicative resources in mobile APs may be utilized to take advantage of available Wi-Fi networks (both private and public), with which the mobile APs may come within their coverage, such as by moving with operating ranges of the corresponding Wi-Fi access points (e.g., Wi-Fi access points (APs) 750 in FIG. 7). In this regard, utilizing such Wi-Fi networks may be desirable, such as to enable reducing utilization of other communication resources (e.g., cellular, etc.). The mobile APs, and the communication networks comprising such mobile APs, may be configured to optimize use of such Wi-Fi networks.

Specifically, in various implementations in accordance with the present disclosure, networks such as the network 700 may be configured to support intelligently offloading traffic to public and private Wi-Fi hotspots, specifically for leveraging the Cloud resources. In this regard, most of vehicles and mobile APs deployed therein may be implemented (e.g., at the factory) with support for both cellular and Wi-Fi connectivity. Vehicles and mobile APs have increasing need of transferring large volumes of data to and from the Cloud.

Data transfers between the vehicles and mobile APs and the Cloud may be normally done through cellular networks, in real-time. In certain cases, Wi-Fi may be used to provide connectivity to other device(s), with the only backhaul used being available broadband connectivity (e.g., 4G-LTE), thus adding such other device(s)' data consumption to a vehicle's traffic. Data needs for the connected vehicle are growing exponentially to support and offload data from sensors, navigation systems and for software updates from telematics and communication units, vehicle operating systems and eventually all vehicle electronic control units (ECUs). However, cellular networks (e.g., 4G/LTE) may not provide enough capacity for the increasing data needs, nor may be able to offer the right quality of service in high-density scenarios, such as cities. Thus, utilizing existing public and private Wi-Fi networks, which may be under-utilized in the same places where cellular networks are at capacity, may enable alleviating data transfer issues.

Accordingly, solutions in accordance with present disclosure may allow for optimizing use of public and/or private Wi-Fi networks, and particularly doing so by intelligently offloading traffic to public and private Wi-Fi hotspots. This may enable vehicles and mobile APs to, for example, download and upload data (offload traffic) by using public and private Wi-Fi access points, while the vehicles incorporating the mobile APs are parked and/or in movement, and may enable the usage of existing public Wi-Fi access points from different Wi-Fi providers with different authentication mechanisms. It may also enable updating usable Wi-Fi providers' lists and authentication mechanisms associate therewith.

In some implementations, solutions in accordance with present disclosure may also enable describing the foundational mechanisms to enable the over-time evolution of the system performance namely in offloading more traffic to public Wi-Fi hotspots, describing the foundational mechanisms to enable the automatic detection of performance events related with the functionality of enabling mobile nodes with access to public and private Wi-Fi hotspot infrastructure to offload traffic, and/or describing the foundational mechanisms for automatic update of usable public and private Wi-Fi access points, including optimized performance configurations of these public and private Wi-Fi access points, by leveraging real-time and historic metadata and self-learning mechanisms.

In some implementations, solutions in accordance with the present disclosure may be implemented in a distributed manner, with functions needed to provide the intelligent offloading traffic being performed by various components of the network. For example, in the example implementation shown in FIG. 7, a Cloud portal 740 (e.g., a server or any other suitable platform) may be used to manage and control intelligent offloading of traffic to public and private Wi-Fi networks/APs. In this regard, the cloud portal 740 may comprise suitable circuitry (including, e.g., one or more of communication circuit(s), circuit(s), processing circuit(s), etc.) for performing the various functions and/or operations attributed to the cloud portal 740. Further, while the cloud portal 740 is illustrated as a single device/system, the disclosure is not so limited. Thus, in some instances, the cloud portal 740 may be implemented in a distributed manner, with some of the functions and/or operations attributed thereto being performed by different physical devices or components that are part of and/or connected to the Internet/cloud 730.

In some implementations, the network 700 may be configured to incorporate a particular networking model/architecture optimized for handling such intelligent offloading of traffic. An example implementation in accordance of the present disclosure in a communication network similar to the network 700 is shown and described with respect to FIG. 8.

Figure 8:
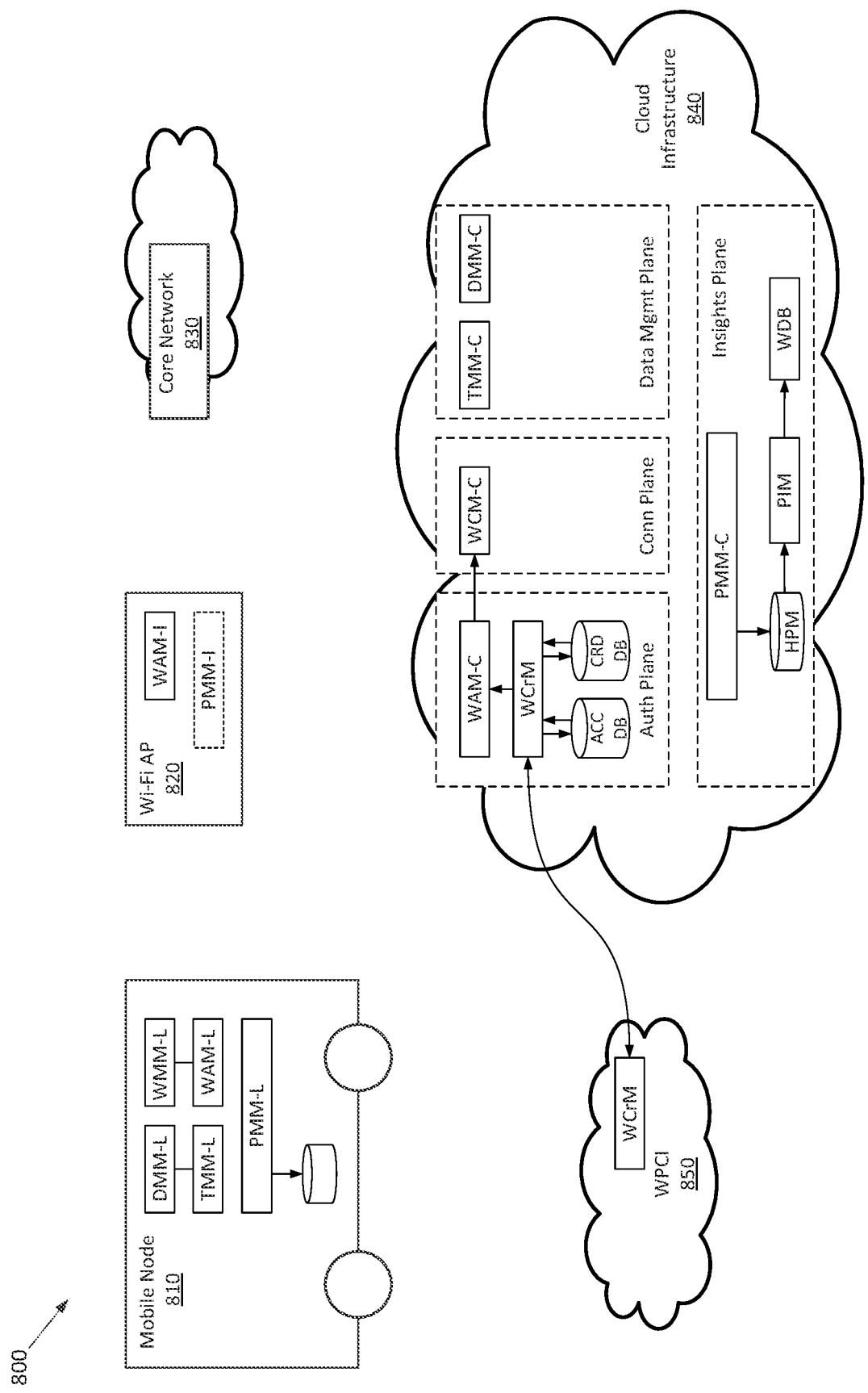
FIG. 8 shows an example network architecture for supporting intelligent offloading of traffic to public and private Wi-Fi hotspots in a network of moving things, in accordance with various aspects of the present disclosure.

FIG. 8 shows an example network architecture for supporting intelligent offloading of traffic to public and private Wi-Fi hotspots in a network of moving things, in accordance with various aspects of the present disclosure. Shown in FIG. 8 is an example network 800.

The example network 800 may, for example, share any or all characteristics with the example networks 100, 200, 300, 400, 500-570, 600, and 700 (and/or network components thereof), discussed herein. The network 800 may be configured for supporting intelligent offloading of traffic to public and private Wi-Fi hotspots. In this regard, the network 800 may incorporate a network mode/architecture particularly configured for performing functions for supporting such intelligent offloading of traffic. For example, as shown in FIG. 8, the network model/architecture may comprise, as main entities, a mobile node (MN) 810, a Wi-Fi access point (AP) 820, core network (CN) 830, Cloud infrastructure (CI) 840, and Wi-Fi provider Cloud infrastructure (WPCI) 850.

The mobile node (MN) 810 may comprise a mobile terminal, equipped with one or more Wi-Fi interfaces, that is required at any given point in time to upload or download data flows (e.g., files, blobs, chunks) or traffic flows (e.g., streams) to and from the Internet. The MN 810 may correspond to the vehicle 710 and the mobile access point (AP) 720 deployed therein in FIG. 7.

The Wi-Fi access point (AP) 820 may comprise a fixed wireless Internet access terminal with Wi-Fi capabilities, controlled by a public or private Wi-Fi operator. The Wi-Fi access point (AP) 820 may be deployed in each of vehicles, as a roadside unit, and may correspond to any of the Wi-Fi APs 750 in FIG. 7, for example.

The core network (CN) may comprise network infrastructure that provides Internet access to the Wi-Fi access points, either provided by wired solutions (e.g., fiber or cable) or wireless wide area networks (e.g., 4G and 5G).

The Cloud infrastructure (CI) 840 may comprise Cloud components that perform control and monitoring operations of the solutions as well as serve as point of entry for any data whose destination resides or goes through the Cloud. The Cloud infrastructure (CI) 840 may be deployed in 3 different, example modes: 1) stand-alone, as a single independent instance running on a controlled Cloud infrastructure, 2) hosted, where it may run as a module part of a Cloud infrastructure provided by another entity, and 3) edge, where it may be deployed on an edge component of the Internet infrastructure as a decentralized solution. The Cloud infrastructure (CI) 840 may correspond to at least a portion of the Cloud 730 in FIG. 7, for example.

The Wi-Fi provider Cloud infrastructure (WPCI) 850 may comprise Cloud components that perform control and monitoring operations of the public or private Wi-Fi infrastructure including the authentication and authorization mechanisms.

In some instances, additional entities may be included in the example network 800, such as a Wi-Fi provider, a telecommunications operator, and/or a service operator. In this regard, a Wi-Fi provider may be responsible for providing public or private Wi-Fi access to the Internet. Access is provided by openly accessing the Wi-Fi AP, through a registration of username/password, and/or to a pre-shared set of credentials. The Wi-Fi provider may also be responsible for the root credentials management system. The telecommunications operator may be responsible for providing the backhaul to the Wi-Fi Access Points and connectivity to the Core Network that serves internet connectivity. The service operator may be responsible for managing and operating the Wi-Fi offload service. This entity may be the same as the Wi-Fi provider, or a third-party entity with access control to operate the network and service configurations.

Each of the entities noted above (e.g., the mobile node (MN) 810, the Wi-Fi access point (AP) 820, the core network (CN) 830, the Cloud infrastructure (CI) 840, and the Wi-Fi provider Cloud infrastructure (WPCI) 850) may comprise suitable circuitry, hardware, software, logic, or any combination thereof, for implementing various aspects of the present disclosure as described herein—e.g., performing functions for supporting intelligent offloading of traffic to public and private Wi-Fi hotspots in a network of moving things as described in the present disclosure. In this regard, description is made hereinafter to various "modules" or "sub-systems" that may be implemented in some of the entities described above. Each such "module" or "sub-system" may comprise suitable circuitry, hardware, software, logic, or any combination thereof for performing or handling functions or operations attributed to that "module" or "sub-system."

Various use-case scenarios may be supported in solutions based on the present disclosure. The use-case scenarios may cover different motion scenarios of the mobile node (MN). For example, the use-case scenarios may include Static scenarios (e.g., the MN is parked in the garage before or after a trip, the MN is waiting in a queue on a drive-thru establishment, the MN is in a traffic jam, the MN is in a depot, dealership or parking lot or space, etc.) and moving scenarios (e.g., the MN is circulating in an urban topology, the MN is circulating in a semi-urban topology, the MN is circulating in a rural topology, etc.).

Additional use-case scenarios may also be contemplated by other types of vehicles and/or unique locations, such as an MN moving on a closed industrial space with access to public or private Wi-Fi infrastructure, an MN moving on a remote location with sporadic access to sparse public or private Wi-Fi infrastructure, a flying MN hovering on a location with access to public or private Wi-Fi infrastructure, etc.

Solutions in accordance with the present disclosure may entail handling or supporting traffic-flow and data-flow. In this regard, traffic-flow as used hereinafter refers to the real-time and end-to-end traffic generated by applications from source to destination (e.g., as defined in RFC 2722). Data-flow as used hereinafter refers to the transit of all delay-tolerant as well as high-priority data packets usually organized in chunks or files.

Solutions in accordance with the present disclosure may support use of various authentication mechanisms. In this regard, Internet access through the Wi-Fi Access Points may be made available by either Open or Secured authentication mechanisms. Open authentication mechanisms describe the connection establishment process where no type of authentication process needs to be performed. Secured authentication mechanism describes the connection establishment process where one authentication mechanism is required and well defined. Secured authentication mechanisms include among others, mechanisms such as: Wi-Fi Protected Access II (WPA2), Wireless Internet Service Provider roaming (WISPr), Hotspot 2.0, 802.1X, proprietary captive portals, and others.

Wi-Fi provider configurations and credentials may be utilized in solutions based on the present disclosure. In this regard, Wi-Fi provider configurations detail the necessary information to connect to the Wi-Fi infrastructure of a public or private Wi-Fi provider. Configurations may follow already-existing standards such as the Wi-Fi Alliance™ Passpoint/Hotspot 2.0 or a customized approach for other authentication profiles such as Protected Extensible Authentication Protocol (PEAP), pre-shared key (PSK), EAP Transport Layer Security (EAP-TLS), EAP Tunneled Transport Layer Security (EAP-TTLS), WISPr, etc.

Offloading of traffic in accordance with solutions based on the present disclosure may entail generating metadata. In this regard, generated metadata may incorporate all the diagnostics and performance information related to key elements. For example, the metadata may include data relating to network (e.g., service set id (SSID), authentication mechanism, max/min/average signal strength, max/min/average throughput, max/min/average latency to endpoint, Wi-Fi connection establishment duration breakdown (e.g., scan, association, authentication, DHCP), etc.), data offload (e.g., total amount of data uploaded, total amount of data downloaded, target amount of data to be uploaded, target amount of data to be downloaded, total number of retransmissions/retries, total packet loss, etc.), system (e.g., max/min/average CPU load, max/min/average memory usage, max/min/average disk storage, list of all system events produced during connection, etc.), and/or context (e.g., vehicle status (e.g., normal, emergency, diagnostics, factory, demo, towing, maintenance), number of neighbor vehicles, status of neighbor vehicles, etc.). All fields included in the metadata may be time-stamped and/or geotagged.

As noted above, the various entities in the network model/architecture may comprise different modules or sub-systems configured for handling particular functions in support of intelligent offloading of traffic to Wi-Fi hotspots, in accordance with the present disclosure. For example, as shown in the example implementation illustrated in FIG. 8, the mobile node (MN) 810 comprises a Wi-Fi Connectivity Module-local (WCM-L), a Wi-Fi Authentication Module-local (WAM-L), a Data Management Module-local (DMM-L), a Traffic Management Module-local (TMM-L), and a Performance Monitoring Module-local (PMM-L).

The WCM-L module is configured for handling the Wi-Fi connection establishment process following the 802.11 standard. The WCM-L module may receive local and over-the-air configurations to tune and adjust the process by changing parameters that affect the Wi-Fi Scan duration and behavior, number of retries, association techniques, authentication protocols, as well as other driver and chipset-related configurations. The WCM-L module may be developed as a monolithic solution or as a modular solution with connection management and technology blocks. The WCM-L module interacts with a local Wi-Fi Authentication module to get the Wi-Fi provider information, including the selected authentication protocol, desired configuration, cost function and other Wi-Fi provider associated details is described next.

The WAM-L module is configured for storing, changing and providing information related to a given Wi-Fi provider. The WAM-L module stores locally the individual Wi-Fi provider information, indexed by SSID, containing standard and non-standard authentication methods including but not exclusively WPA-2, PSK, Open, Passpoint, WISPr, non-WISPr captive portal, etc. Additionally, the provider-specific configurations may optionally detail both dynamic and fixed cost-functions that define credits or currency cost per unit of data transferred (KB, MB, GB) or by total connected time after first-successful byte transmission. The WAM-L module also receives and leverages the uniquely assigned credentials necessary to perform the authentication with the public or private Wi-Fi infrastructure. The credentials are securely stored, using a hardware or software secure storage solution. Credentials may be updated while installing the software the first time, or over-the-air using a secure end-to-end communication with the WAM-C, part of the Cloud Infrastructure, described further below.

The DMM-L module is configured for applying priorities and scheduling of delay-tolerant data flows to be transmitted in (Cloud-to-vehicle), out (vehicle-to-Cloud), or through (vehicle-to-vehicle-to-destination) the vehicle. The DMM-L module is also responsible for the transmission of each data-flow to its destination endpoint. The DMM-L module stores the local policies to be applied to each data flow, as well as any outstanding configurations that may relate with data flow compression, preferred transport protocol, end-point authentication, storage mechanism, file-encryption and others.

The TMM-L module is configured for applying traffic shaping, throttling and classes of traffic policies for all incoming and outgoing network traffic. The TMM-L module stores the traffic policies to be applied to each traffic flow as well as any outstanding configurations that may related with traffic flow compression, caching and buffering, cyphering, QoS, and others.

The PMM-L module is configured for collecting, storing and aggregating the performance metadata produced by all the modules included in the MN sub-systems.

As shown in the example implementation illustrated in FIG. 8, the Wi-Fi access point (Wi-Fi AP) 820 may comprises a Wi-Fi Authentication Module-infrastructure (WAM-I), as well as (optionally) a Performance Monitoring Module-infrastructure (PMM-I). The WAM-I module is configured for providing the necessary functionality for standard and non-standard Wi-Fi authentication methods including but not exclusively WPA-2, PSK, Open, Passpoint, WISPr, non-WISPr captive portal. The WAM-I module may be offered off-the-shelf in infrastructure equipment that provides Internet connectivity over Wi-Fi to wireless devices. The optional PMM-I module is configured for performance metadata collection, to provide further functionality and richer data collection.

As shown in the example implementation illustrated in FIG. 8, the Cloud infrastructure (CI) 840 comprises Wi-Fi Connectivity Module-central (WCM-C), Wi-Fi Authentication Module-central (WAM-C), Wi-Fi Credentials Manager (WCrM), Data Management Module-central (DMM-C), Traffic Management Module-central (TMM-C), Performance Monitoring Module-central (PMM-C), Historic Performance Module (HPM), Performance Insights Module (PIM), and Wi-Fi Decision Block (WDB). In this regard, similarly named modules as those described above with the respect to the MN are counterpart sub-systems for these similarly named sub-systems available in the MN.

The WCM-C module is configured for global management and distribution of configurations to tune and adjust the process by changing parameters that affect, for example, the Wi-Fi Scan duration and behavior, number of retries, association techniques, authentication protocols, as well as other driver and chipset-related configurations.

The WAM-C module is configured for global management and distribution of Wi-Fi provider information, containing standard and non-standard authentication methods including but not exclusively WPA-2, PSK, Open, Passpoint, WISPr, non-WISPr captive portal. Additionally, provider-specific configurations may include (1) dynamic and fixed cost-functions that define credits for currency cost per unit of data transferred (KB, MB, GB) or by total connected time after first-successful byte transmission; and (2) networking quality of service (QoS) requirements to connect to the public or private Wi-Fi hotspots, including but not exclusively latency to the internet, RSSI, jitter, number of other devices connected, etc. The WAM-C module is also configured for distributing the unique credentials assigned to individual vehicles or groups of vehicles as defined by the authorization rules, set by the network operator. Such credentials are retrieved from a Wireless Credentials Manager, further described below.

The WCrM module is configured for management of the uniquely assigned credentials necessary to perform the authentication of vehicles with the public or private Wi-Fi infrastructure. Credentials may be created, changed, updated, revoked, or deleted directly in the WCrM module or through communication with an external WCrM deployed in the Wi-Fi provider Cloud Infrastructure (WPCI) 850. The WCrM interacts with 2 storage components: a Credentials Database (CRD-DB), where all uniquely assigned credentials are stored securely, and an Accounting Database (ACC-DB), where all accounting-related data is stored for billing and usage-control purposes.

The DMM-C module is configured for global management of policies for prioritization and scheduling of delay-tolerant data flows to be transmitted in (Cloud-to-vehicle), out (vehicle-to-Cloud), or through (vehicle-to-vehicle-to-destination) the vehicle. The DMM-C module stores all global policies to be applied to each configured data flow, as well as any outstanding configurations that may relate with data flow compression, preferred transport protocol, end-point authentication, storage mechanism, file-encryption and others.

The TMM-C module is configured for the global management and distribution of traffic shaping, throttling and classes of traffic policies for all incoming and outgoing network traffic. The TMM-C module stores all global traffic policies to be applied to each traffic flow as well as any outstanding configurations that may related with traffic flow compression, caching and buffering, cyphering, QoS, and/or others.

The PMM-C module is configured for collecting, storing and aggregating the performance metadata produced by MN and Wi-Fi AP sub-systems. The PMM-C module may also collect all metadata generated by the Cloud infrastructure sub-systems, including the WCM-C module, the WAM-C module, the WCrM module, the DMM-C module, and the TMM-C. The PMM-C then interacts with further blocks to provide the necessary data for the self-learning and automation functionalities included in this invention. The PMM-C module interacts with the HPM module, the PIM module, and the WDB module.

The HPM module is configured for the timestamping and storing of all location where all performance metadata in a cold-storage database. The HPM module provides query and retrieval functions to be used by the PIM module.

The PIM module is configured for the fusion and pattern detection of the metadata stored in the HPM module with the real-time metadata received by the HPM. Patterns include the detection of real-time metadata anomalies, correlation with known metadata anomalies from the past, as well as other related and relevant patterns. Patterns are defined by the definition of function inputs that set the criteria for triggering the insights based on the metadata. In this regard, as used herein, "insights" denote awareness and knowledge of pertinent conditions (including Wi-Fi related conditions), and corresponding actions based thereon that may be available to the vehicle to take. Further, insights may be originated in the Cloud or at the vehicle level. This may include conditions that the vehicle may assess autonomously—that is, based on determinations or measurements made at the vehicle. For example, vehicle speed may be used to determine whether a connection to a certain hotspot is feasible and desirable or not. The threshold for connection is based on historic information on the behavior of the hotspot.

The WDB module is configured for collecting the insights produced by PIM and apply the decision parameters set in the system. The decision parameters define what actions should be triggered whenever a given Insight happens for a specific context. Context may be defined by a combination of one or more criteria, such as: time of day, location of the MN, unique identifier of MN, cluster that the MN belongs to, number of mobile nodes (MNs) in the vicinity, active set of configurations for all the modules covered in this invention, system performance, metadata patterns, time of day, location of the MN, unique identifier of MN, cluster that the MN belongs to, number of MNs in the vicinity, active set of configurations for all the modules covered in this invention, system performance, metadata patterns, etc.

Actions triggered by metadata may include, for example, reporting an event, suggesting a most-favorable configuration, and/or automatic rollout of a most-favorable configuration change. The most-favorable configuration may be determined by extrapolating which configuration parameters are provided as part of the function inputs added in the PIM. At least some of the modules described above may operate cooperatively to provide over-the-air functionality of translating the global configurations into local rules by applying changes in real-time or with some pre-programmed delay to one or more vehicles that is/are part of a vehicle network. Such decisions as when and where to apply such configurations may be, for example, by a default setting to be operated manually through APIs or through a Cloud dashboard. Various features implemented in accordance with the present disclosure may bring further automation to the decision trigger for the detailed configurations.

The modules described above may be grouped into different groups (or "planes") that profile separate functionality, where these modules (and any additional entities) may operate cooperatively. For example, as shown in FIG. 8, the different modules may be assigned into four different planes: Authentication, Connectivity, Data Management and Insights Planes. The Connectivity Plane includes all functionalities that relate with the process of establishing a wireless connection between MNs and Wi-Fi APs. Functionalities cover not only the standards related with the Wi-Fi connection establishment process and authentication, as well as its configuration, management, and monitoring. The Data Management Plane includes all functionalities that relate with the process of moving the data traffic included in the traffic flows and data flows. Functionalities cover not only the process of moving data in and out of the MN but also its configuration, management, and monitoring. The Authentication Plane includes all functionalities that relate to the Wi-Fi Authentication process, by which MNs authenticate with the Wi-Fi AP infrastructure and Wi-Fi Operator Infrastructure. Such functionalities may cover not only the authentication mechanisms and authorized credentials but also configuration, management, logging, and monitoring. The Insights Plane includes all the functionalities that relate with extracting automatically relevant analytics and operational insights that influence the performance of the traffic offloading solution using public and private Wi-Fi Hotspots.

A system or network implemented in accordance with the present disclosure may be configured for performing various processes (e.g., using the modules described above) in support of intelligent offloading of traffic to Wi-Fi hotspots. One example process is pre-population of authentication credentials for known Wi-Fi networks. For example, the WAM-L module of the MN may be loaded with a list of SSIDs and respective authentication credentials. Authentication credentials may be updated during the first software installation process, loaded from the file or downloaded from the WAM-C module in case an Internet connection is available.

Another example process is standard Wi-Fi connection establishment with a public Wi-Fi hotspot. For example, the WCM-L module of the MN may periodically scan for Wi-Fi networks. The moment a Wi-Fi network is detected, the WCM-L module probes the WAM-L module to check if any of the detected SSIDs is known. If a given SSID is available in the list of SSIDs maintained by the WAM-L module, the respective authentication credentials are returned to the WCM-L module. If more than one SSID is available in the list of networks maintained by the WAM-L module, the relative priority of the SSIDs is considered and the list of authentication credentials per SSID ordered by priority is returned. The WCM-L module then uses returned credentials to perform the Wi-Fi connection establishment process. The WCM-L module exchanges the credentials with the WAM-I of the access point broadcasting the selected Wi-Fi network, following its authentication method and relying on the standard Wi-Fi connection establishment process steps. After successful connection, the MN connects to the Internet using the public or private Wi-Fi hotspot.

Another example process is an update of authentication credentials for known Wi-Fi networks. In this regard, authentication credentials may be updated post software installation by using over-the-air content update mechanisms (e.g., over 4G-LTE, 5G or Wi-Fi), relying on a secure end-to-end communication between the WAM-L module and the WAM-C module. When an Internet connection is available, the WAM-L module periodically sends a request to the WAM-C module, to get the latest list of authentication credentials available for the specific MN. The WAM-C module uses an MN identifier, provided in the request, to check with the WCrM which credentials are available. The most recent list of the authentication credentials available for the specific MN are then returned to the WAM-L module and the local list of SSIDs and respective authentications may be updated.

Additionally, the Wi-Fi provider, or any other operator of the Wi-Fi service, may define logic for assigning authentication credentials uniquely to each MN, or to clusters and groups of MNs according to any business logic defined. The authentication credentials logic is defined in the WAM-C module. For example. The WAM-C module interacts with the WCrM to store the respective credentials and business logic. Further optimizations on the update of authentication credentials for known Wi-Fi networks may be done by utilizing hashes of the list of authentication credentials to check if there was any update or alternatively, adding the date of last credential's list update in the request sent from the WAM-L module to the WAM-C module.

Another example process is the collection of performance metadata for system diagnostics and future use-cases. In this regard, the metadata (e.g., as described above) generated before, during and after the successful connection to the public or private Wi-Fi access point is stored in the PMM-L module of the MN. In an example embodiment, when the MN is connected, all components that produce the required metadata, namely the WCM-L module, WAM-L module, DMM-L module, and TMM-L module periodically push the required information to the PMM-L module. The PMM-L module probes, either to periodic poling or event subscription, the WCM-L module for detecting when a connection to a public or private Wi-Fi Hotspot is terminated.

When the connection termination is detected, the PMM-L module packages all the metadata from the terminated connection. When a new Internet connection is available, the PMM-L module interacts with the DMM-L module to send the packaged metadata to the PMM-C module. The PMM-C module may then unpack and publish the data to the HPM module and the PIM module. The HPM module and PIM module, together with the WDB module then makes use of the metadata for functionalities related with the intelligent update of usable public and private Wi-Fi access points by leveraging real-time and historic data for pattern detections, outside of the scope of the current invention.

Accordingly, implementations in accordance with the present disclosure may enable devices in an Internet of Moving Things (IoMT) to connect automatically to existing public and private Wi-Fi hotspot infrastructure. In this regard, solutions in accordance with the present disclosure may enable moving nodes to connect to a number of public and private Wi-Fi hotspots from different providers using several authentication mechanisms, all controlled from the Cloud. Further, these solutions may enable mobile nodes to connect to and leverage new public and private Wi-Fi hotspots from existing and new providers by securely receiving new authentication credentials from the Cloud. These solutions may also enable Wi-Fi providers to refresh the access and authentication credentials of specific and groups of mobile nodes using the Cloud.

The solutions may also enable Wi-Fi providers to perform billing and cost control on the activity of providing Internet access to mobile nodes, using their infrastructure of Wi-Fi hotspots. Further, these solutions may define a Cloud architecture that enables the over-time evolution of the system performance namely in offloading more traffic to public Wi-Fi hotspots. These solutions may also define a Cloud architecture that enables the automatic detection of performance events related with the functionalities of enabling mobile nodes with access to public and private Wi-Fi hotspot infrastructure to offload traffic. These solutions may also define a Cloud architecture that enables automatic update of usable public and private Wi-Fi access points, including optimized performance configurations, by leveraging real-time and historic metadata and self-learning mechanisms.

Solutions in accordance with the present disclosure may allow for connectivity to and/or utilization of Wi-Fi infrastructure in networks of moving things in various use-case scenarios. In an example use-case scenario, a MN driving in an urban environment may connect to a pre-configured public Wi-Fi hotspot.

In another example use-case scenario, a MN driving in an urban environment may connect to more public Wi-Fi hotspots offered by new providers, received from the Cloud. In another example use-case scenario, a MN driving in an urban environment may connect to a public Wi-Fi hotspot leveraging an optimized connection establishment process with information received from the Cloud.

In another example use-case scenario, a network performance anomaly may be detected in the Cloud infrastructure and a warning may be triggered for manual distribution back to the network of MNs to improve the Wi-Fi connection establishment process.

In another example use-case scenario, a network performance anomaly may be detected in the Cloud infrastructure and an automatic network configuration may be generated and sent to the MNs to improve the Wi-Fi connection establishment process.

In another example use-case scenario, applications traffic and data from the applications running in the MN are prioritized according to the quality of service offered by the public or private Wi-Fi hotspots the MN has available to connect.

In various implementations, additional improvements (or entities) may be incorporated into solutions implemented in accordance with the present disclosure, to further enhance performance. For example, a Cloud-based system may be added for post-processed insights based on performance metadata to deliver network, infrastructure and business improvements to Wi-Fi service providers and telecommunications operators. A Cloud-based system may be added for real-time events processing, based on performance metadata, including the automatic update of network configurations to the network of moving nodes in order to improve the overall quality of service of the functionality of offloading traffic to public and private Wi-Fi hotspots.

Another change may be incorporating support for criteria-based Wi-Fi connection establishment to public and private Wi-Fi hotspots, using networking conditions and other cost functions, defined in the Cloud. Another change may be incorporating support for mobile node (MN) traffic and data management prioritization based on network performance predictions, originated in the Cloud.

An example system for intelligent offloading of traffic to public and private Wi-Fi hotspots in a network of moving things, in accordance with the present disclosure, comprises a mobile node (MN), at least one storage circuit and at least one processing circuit. The MN comprises at least one communication circuit configured to communicate signals for transmission and reception of data. The at least one storage circuit is configured to store instructions and data. The at least one processing circuit is configured to, based, at least in part, on instructions and/or data stored in the at least one storage circuit, detect during operation within an area of the network of moving things, Wi-Fi access points (APs) providing coverage within the area, setup one or more Wi-Fi connections to at least one Wi-Fi access points (AP) based on the Wi-Fi access information, and manage data transfer to and/or from the mobile node (MN). The managing comprises offloading at least a portion of the data transfer to the one or more Wi-Fi connections, with the offloading being performed to offload cellular communications, and setting or adjusting one or more parameters associated with offloaded data and/or data transfer via the one or more Wi-Fi connections.

In an example implementation, the at least one processing circuit is configured to maintain a Wi-Fi related dataset comprising information relating to access to and/or use of Wi-Fi access points (APs) during operation of the mobile node (MN).

In an example implementation, the at least one processing circuit is configured to setup or configure the one or more Wi-Fi connections based on the Wi-Fi related dataset.

In an example implementation, the at least one processing circuit is configured to generate or update the Wi-Fi related dataset based on interactions with Wi-Fi access points (APs) providing coverage within the area.

In an example implementation, the at least one processing circuit is configured to provide to a cloud portal associated with the network of moving things, the Wi-Fi related dataset or information based on the Wi-Fi related dataset.

In an example implementation, the at least one processing circuit is configured to obtain from a cloud portal associated with the network of moving things, Wi-Fi related information configured for facilitating access to and/or use of Wi-Fi access points (APs) providing coverage within the area.

In an example implementation, the at least one processing circuit is configured to set or adjust the one or more parameters associated with the offloaded data and/or the data transfer via the one or more Wi-Fi connections based on pre-set policies or criteria.

An example system for intelligent offloading of traffic to public and private Wi-Fi hotspots in a network of moving things, in accordance with the present disclosure, comprises a central portal server and at least one processing circuit. The central portal server comprises at least one storage circuit configured to store instructions and data. The at least one processing circuit is configured to, based, at least in part, on instructions and/or data stored in the at least one storage circuit, manage offloading data transfer in an area of the network of moving things to Wi-Fi access points (APs). The managing comprises identifying one or more Wi-Fi access points (APs) providing coverage within the area of the network of moving things, and configuring for each Wi-Fi access point of the one or more Wi-Fi access points (APs) corresponding Wi-Fi access information configured for facilitating secure access to and use of the Wi-Fi access point by mobile nodes (MNs) operating within service range of the Wi-Fi access point for offloading data transfer.

In an example implementation, the at least one processing circuit is configured to provide Wi-Fi access information to one or more mobile nodes (MNs) operating in the area of the network of moving things.

In an example implementation, the at least one processing circuit is configured to maintain performance related data associated with the one or more Wi-Fi access points (APs) and use of the one or more Wi-Fi access points (APs) in offloading data transfer.

In an example implementation, the at least one processing circuit is configured to generate or update the performance related data based on reported information from one or more (MNs) operating within the area of the network of moving things.

An example method for intelligent offloading of traffic to public and private Wi-Fi hotspots in a network of moving things, in accordance with the present disclosure, comprises detecting by a mobile node (MN), during operation within an area of the network of moving things, Wi-Fi access points (APs) providing coverage within the area, and setting up one or more Wi-Fi connections to at least one Wi-Fi access points (AP) based on the Wi-Fi access information. The method further comprises managing data transfer to and/or from the mobile node (MN). The managing comprises offloading at least a portion of the data transfer to the one or more Wi-Fi connections, with the offloading being performed to offload cellular communications, and setting or adjusting one or more parameters associated with offloaded data and/or data transfer via the one or more Wi-Fi connections.

In an example implementation, the method further comprises setting up or configuring the one or more Wi-Fi connections based on Wi-Fi related dataset configured for facilitating secure access to and use of at least one Wi-Fi access points (AP) by mobile nodes (MNs) operating within service range of the Wi-Fi access point for offloading data transfer.

In an example implementation, the method further comprises maintaining the Wi-Fi related dataset in one or both of the mobile node (MN) and a cloud portal associated with the network of moving things.

In an example implementation, the method further comprises generating or updating the Wi-Fi related dataset by one or both of the mobile node (MN) and a cloud portal associated with the network of moving things.

In an example implementation, the method further comprises generating or updating the Wi-Fi related dataset based on interactions with Wi-Fi access points (APs) providing coverage within the area.

In an example implementation, the method further comprises obtaining from a cloud portal associated with the network of moving things, Wi-Fi related information configured for facilitating access to and/or use of Wi-Fi access points (APs) providing coverage within the area.

In an example implementation, the method further comprises setting or adjusting of the one or more parameters associated with the offloaded data and/or the data transfer via the one or more Wi-Fi connections based on pre-set policies or criteria.

In an example implementation, the setting or adjusting of the one or more parameters associated with the offloaded data and/or the data transfer via the one or more Wi-Fi connections based on pre-set policies or criteria comprises applying one or more of data prioritization, scheduling of delay-tolerant, data flow compression, transport protocol configuration, endpoint authentication, storage mechanism, and file-encryption.

In an example implementation, the setting or adjusting of the one or more parameters associated with the offloaded data and/or the data transfer via the one or more Wi-Fi connections based on pre-set policies or criteria comprises applying one or more of traffic shaping, throttling, traffic flow compression, caching and buffering, cyphering, and quality-of-service (QoS) configuration.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

Accordingly, various embodiments in accordance with the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

Various embodiments in accordance with the present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

In accordance with various aspects of this disclosure, examples of the networks and/or components thereof presented herein are provided in U.S. Provisional Application Ser. No. 62/222,192, titled "Communication Network of Moving Things," filed on Sep. 22, 2015, which is hereby incorporated herein by reference in its entirety.

In accordance with various aspects of this disclosure, the networks and/or components thereof presented herein are provided with systems and methods for integrating such networks and/or components with other networks and systems, non-limiting examples of which are provided in U.S. Provisional Application Ser. No. 62/221,997, titled "Integrated Communication Network for A Network of Moving Things," filed on Sep. 22, 2015, which is hereby incorporated herein by reference in its entirety.

Also, in accordance with various aspects of this disclosure, the networks and/or components thereof presented herein are provided with systems and methods for synchronizing such networks and/or components, non-limiting examples of which are provided in U.S. Provisional Application Ser. No. 62/222,016, titled "Systems and Methods for Synchronizing a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for managing such networks and/or components, non-limiting examples of which are provided in U.S. Provisional Application Ser. No. 62/222,042, titled "Systems and Methods for Managing a Network of Moving Things," filed on Sep. 22, 2015, which is hereby incorporated herein by reference in its entirety.

Further, in accordance with various aspects of this disclosure, the networks and/or components thereof presented herein are provided with systems and methods for monitoring such networks and/or components, non-limiting examples of which are provided in U.S. Provisional Application Ser. No. 62/222,066, titled "Systems and Methods for Monitoring a Network of Moving Things," filed on Sep. 22, 2015, which is hereby incorporated herein by reference in its entirety.

Still further, in accordance with various aspects of this disclosure, the networks and/or components thereof presented herein are provided with systems and methods for detecting and/or classifying anomalies in such networks and/or components, non-limiting examples of which are provided in U.S. Provisional Application Ser. No. 62/222,077, titled "Systems and Methods for Detecting and Classifying Anomalies in a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for managing mobility in such networks and/or components, non-limiting examples of which are provided in U.S. Provisional Application Ser. No. 62/222,098, titled "Systems and Methods for Managing Mobility in a Network of Moving Things," filed on Sep. 22, 2015, which is hereby incorporated herein by reference in its entirety.

Also, in accordance with various aspects of this disclosure, the networks and/or components thereof presented herein are provided with systems and methods for managing connectivity in such networks and/or components, non-limiting examples of which are provided in U.S. Provisional Application Ser. No. 62/222,121, titled "Systems and Methods for Managing Connectivity a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for collecting sensor data in such networks and/or components, non-limiting examples of which are provided in U.S. Provisional Application Ser. No. 62/222,135, titled "Systems and Methods for Collecting Sensor Data in a Network of Moving Things," filed on Sep. 22, 2015, which is hereby incorporated herein by reference in its entirety.

Further, in accordance with various aspects of this disclosure, the networks and/or components thereof presented herein are provided with systems and methods for interfacing with such networks and/or components, non-limiting examples of which are provided in U.S. Provisional Application Ser. No. 62/222,145, titled "Systems and Methods for Interfacing with a Network of Moving Things," filed on Sep. 22, 2015, which is hereby incorporated herein by reference in its entirety.

Still further, in accordance with various aspects of this disclosure, the networks and/or components thereof presented herein are provided with systems and methods for interfacing with a user of such networks and/or components, non-limiting examples of which are provided in U.S. Provisional Application Ser. No. 62/222,150, titled "Systems and Methods for Interfacing with a User of a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for data storage and processing in such networks and/or components, non-limiting examples of which are provided in U.S. Provisional Application Ser. No. 62/222,168, titled "Systems and Methods for Data Storage and Processing for a Network of Moving Things," filed on Sep. 22, 2015, which is hereby incorporated herein by reference in its entirety.

Also, in accordance with various aspects of this disclosure, the networks and/or components thereof presented herein are provided with systems and methods for vehicle traffic management in such networks and/or components, non-limiting examples of which are provided in U.S. Provisional Application Ser. No. 62/222,183, titled "Systems and Methods for Vehicle Traffic Management in a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for environmental management in such networks and/or components, non-limiting examples of which are provided in U.S. Provisional Application Ser. No. 62/222,186, titled "Systems and Methods for Environmental Management in a Network of Moving Things," filed on Sep. 22, 2015, which is hereby incorporated herein by reference in its entirety.

Further, in accordance with various aspects of this disclosure, the networks and/or components thereof presented herein are provided with systems and methods for managing port or shipping operation in such networks and/or components, non-limiting examples of which are provided in U.S. Provisional Application Ser. No. 62/222,190, titled "Systems and Methods for Port Management in a Network of Moving Things," filed on Sep. 22, 2015, which is hereby incorporated herein by reference in its entirety.

Also, in accordance with various aspects of this disclosure, the networks and/or components thereof presented herein are provided with systems and methods for enhancing the accuracy of positioning or location information based at least in part on historical data, non-limiting examples of which are provided in U.S. Provisional Application Ser. No. 62/244,828, titled "Utilizing Historical Data to Correct GPS Data in a Network of Moving Things," filed on Oct. 22, 2015, which is hereby incorporated herein by reference in its entirety.

Additionally, in accordance with various aspects of this disclosure, the networks and/or components thereof presented herein are provided with systems and methods for enhancing the accuracy of position or location of positioning or location information based at least in part on the utilization of anchors, non-limiting examples of which are provided in U.S. Provisional Application Ser. No. 62/244,930, titled "Using Anchors to Correct GPS Data in a Network of Moving Things," filed on Oct. 22, 2015, which is hereby incorporated herein by reference in its entirety.

Further, in accordance with various aspects of this disclosure, the networks and/or components thereof presented herein are provided with systems and methods for providing communication between applications, non-limiting examples of which are provided in U.S. Provisional Application Ser. No. 62/246,368, titled "Systems and Methods for Inter-Application Communication in a Network of Moving Things," filed on Oct. 26, 2015, which is hereby incorporated herein by reference in its entirety.

Still further, in accordance with various aspects of this disclosure, the networks and/or components thereof presented herein are provided with systems and methods for probing, analyzing and/or validating communication, non-limiting examples of which are provided in U.S. Provisional Application Ser. No. 62/246,372, titled "Systems and Methods for Probing and Validating Communication in a Network of Moving Things," filed on Oct. 26, 2015, which is hereby incorporated herein by reference in its entirety.

Yet further, in accordance with various aspects of this disclosure, the networks and/or components thereof presented herein are provided with systems and methods for adapting communication rate, non-limiting examples of which are provided in U.S. Provisional Application Ser. No.

62/250,544, titled "Adaptive Rate Control for Vehicular Networks," filed on Nov. 4, 2015, which is hereby incorporated herein by reference in its entirety.

Also, in accordance with various aspects of this disclosure, the networks and/or components thereof presented herein are provided with systems and methods for reconfiguring and adapting hardware, non-limiting examples of which are provided in U.S. Provisional Application Ser. No. 62/273,878, titled "Systems and Methods for Reconfiguring and Adapting Hardware in a Network of Moving Things," filed on Dec. 31, 2015, which is hereby incorporated herein by reference in its entirety.

Additionally, in accordance with various aspects of this disclosure, the networks and/or components thereof presented herein are provided with systems and methods for optimizing the gathering of data, non-limiting examples of which are provided in U.S. Provisional Application Ser. No. 62/253,249, titled "Systems and Methods for Optimizing Data Gathering in a Network of Moving Things," filed on Nov. 10, 2015, which is hereby incorporated herein by reference in its entirety.

Further, in accordance with various aspects of this disclosure, the networks and/or components thereof presented herein are provided with systems and methods for performing delay tolerant networking, non-limiting examples of which are provided in U.S. Provisional Application Ser. No. 62/257,421, titled "Systems and Methods for Delay Tolerant Networking in a Network of Moving Things," filed on Nov. 19, 2015, which is hereby incorporated herein by reference in its entirety.

Still further, in accordance with various aspects of this disclosure, the networks and/or components thereof presented herein are provided with systems and methods for improving the coverage and throughput of mobile access points, non-limiting examples of which are provided in U.S. Provisional Application Ser. No. 62/265,267, titled "Systems and Methods for Improving Coverage and Throughput of Mobile Access Points in a Network of Moving Things," filed on Dec. 9, 2015, which is hereby incorporated herein by reference in its entirety.

Yet further, in accordance with various aspects of this disclosure, the networks and/or components thereof presented herein are provided with systems and methods for coordinating channel utilization, non-limiting examples of which are provided in U.S. Provisional Application Ser. No. 62/270,858, titled "Channel Coordination in a Network of Moving Things," filed on Dec. 22, 2015, which is hereby incorporated herein by reference in its entirety.

Also, in accordance with various aspects of this disclosure, the networks and/or components thereof presented herein are provided with systems and methods for implementing a network coded mesh network in the network of moving things, non-limiting examples of which are provided in U.S. Provisional Application Ser. No. 62/257,854, titled "Systems and Methods for Network Coded Mesh Networking in a Network of Moving Things," filed on Nov. 20, 2015, which is hereby incorporated herein by reference in its entirety.

Additionally, in accordance with various aspects of this disclosure, the networks and/or components thereof presented herein are provided with systems and methods for improving the coverage of fixed access points, non-limiting examples of which are provided in U.S. Provisional Application Ser. No. 62/260,749, titled "Systems and Methods for Improving Fixed Access Point Coverage in a Network of Moving Things," filed on Nov. 30, 2015, which is hereby incorporated herein by reference in its entirety.

Further, in accordance with various aspects of this disclosure, the networks and/or components thereof presented herein are provided with systems and methods for managing mobility controllers and their network interactions, non-limiting examples of which are provided in U.S. Provisional Application Ser. No. 62/273,715, titled "Systems and Methods for Managing Mobility Controllers and Their Network Interactions in a Network of Moving Things," filed on Dec. 31, 2015, which is hereby incorporated herein by reference in its entirety.

Still further, in accordance with various aspects of this disclosure, the networks and/or components thereof presented herein are provided with systems and methods for managing and/or triggering handovers of mobile access points, non-limiting examples of which are provided in U.S. Provisional Application Ser. No. 62/281,432, titled "Systems and Methods for Managing and Triggering Handovers of Mobile Access Points in a Network of Moving Things," filed on Jan. 21, 2016, which is hereby incorporated herein by reference in its entirety.

Yet further, in accordance with various aspects of this disclosure, the networks and/or components thereof presented herein are provided with systems and methods for performing captive portal-related control and management, non-limiting examples of which are provided in U.S. Provisional Application Ser. No. 62/268,188, titled "Captive Portal-related Control and Management in a Network of Moving Things," filed on Dec. 16, 2015, which is hereby incorporated herein by reference in its entirety.

Also, in accordance with various aspects of this disclosure, the networks and/or components thereof presented herein are provided with systems and methods for extrapolating high-value data, non-limiting examples of which are provided in U.S. Provisional Application Ser. No. 62/270,678, titled "Systems and Methods to Extrapolate High-Value Data from a Network of Moving Things," filed on Dec. 22, 2015, which is hereby incorporated herein by reference in its entirety.

Additionally, in accordance with various aspects of this disclosure, the networks and/or components thereof presented herein are provided with systems and methods for providing remote software updating and distribution, non-limiting examples of which are provided in U.S. Provisional Application Ser. No. 62/272,750, titled "Systems and Methods for Remote Software Update and Distribution in a Network of Moving Things," filed on Dec. 30, 2015, which is hereby incorporated herein by reference in its entirety.

Further, in accordance with various aspects of this disclosure, the networks and/or components thereof presented herein are provided with systems and methods for providing remote configuration updating and distribution, non-limiting examples of which are provided in U.S. Provisional Application Ser. No. 62/278,662, titled "Systems and Methods for Remote Configuration Update and Distribution in a Network of Moving Things," filed on Jan. 14, 2016, which is hereby incorporated herein by reference in its entirety.

Still further, in accordance with various aspects of this disclosure, the networks and/or components thereof presented herein are provided with systems and methods for adapting the network, for example automatically, based on user feedback, non-limiting examples of which are provided in U.S. Provisional Application Ser. No. 62/286,243, titled "Systems and Methods for Adapting a Network of Moving Things Based on User Feedback," filed on Jan. 22, 2016, which is hereby incorporated herein by reference in its entirety.

Yet further, in accordance with various aspects of this disclosure, the networks and/or components thereof presented herein are provided with systems and methods for enhancing and/or guaranteeing data integrity when building or performing data analytics, non-limiting examples of which are provided in U.S. Provisional Application Ser. No. 62/278,764, titled "Systems and Methods to Guarantee Data Integrity When Building Data Analytics in a Network of Moving Things," Jan. 14, 2016, which is hereby incorporated herein by reference in its entirety.

Also, in accordance with various aspects of this disclosure, the networks and/or components thereof presented herein are provided with systems and methods for performing self-initialization and/or automated bootstrapping of mobile access points, non-limiting examples of which are provided in U.S. Provisional Application Ser. No. 62/286,515, titled "Systems and Methods for Self-Initialization and Automated Bootstrapping of Mobile Access Points in a Network of Moving Things," filed on Jan. 25, 2016, which is hereby incorporated herein by reference in its entirety.

Additionally, in accordance with various aspects of this disclosure, the networks and/or components thereof presented herein are provided with systems and methods for managing power supply and/or utilization, non-limiting examples of which are provided in U.S. Provisional Application Ser. No. 62/295,602, titled "Systems and Methods for Power Management in a Network of Moving Things," filed on Feb. 16, 2016, which is hereby incorporated herein by reference in its entirety.

Further, in accordance with various aspects of this disclosure, the networks and/or components thereof presented herein are provided with systems and methods for automating and easing the installation and setup of the infrastructure, non-limiting examples of which are provided in U.S. Provisional Application Ser. No. 62/299,269, titled "Systems and Methods for Automating and Easing the Installation and Setup of the Infrastructure Supporting a Network of Moving Things," filed on Feb. 24, 2016, which is hereby incorporated herein by reference in its entirety.

In summary, various aspects of this disclosure provide communication network architectures, systems and methods for supporting a network of mobile nodes, for example comprising a combination of mobile and stationary nodes. As a non-limiting example, various aspects of this disclosure provide communication network architectures, systems, and methods for supporting a dynamically configurable communication network comprising a complex array of both static and moving communication nodes (e.g., the Internet of moving things). While the foregoing has been described with reference to certain aspects and examples, it will be understood by those skilled in the art that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular example(s) disclosed, but that the disclosure will include all examples falling within the scope of the appended claims.

What is claimed is:

1. A system configured for intelligent offloading of traffic to public and private Wi-Fi hotspots in a network of moving things, the system comprising:
   a mobile node (MN) deployed in a vehicle, the mobile node (MN) comprising:
   at least one communication circuit configured to communicate signals for transmission and reception of data;
   at least one storage circuit configured to store instructions and data; and
   at least one processing circuit configured to, based, at least in part, on instructions and/or data stored in the at least one storage circuit:
   detect during operation within an area of the network of moving things, Wi-Fi access points (APs) providing coverage within the area;
   set up one or more Wi-Fi connections to at least one Wi-Fi access points (AP) based on the Wi-Fi access information;
   manage data transfer to and/or from the mobile node (MN), wherein the managing comprises;
      offloading at least a portion of the data transfer to the one or more Wi-Fi connections, wherein the offloading is performed to offload cellular communications; and
      one or both of:
         scheduling of one or more delay-tolerant data flows to be communicated to and/or from the vehicle, based on data management policies; and
         applying traffic shaping, traffic throttling and/or classes of traffic policies for one or more of incoming and outgoing network traffic, based on traffic management policies;
   generate performance metadata relating to offloading of data in the mobile node (MN), the performance metadata comprising diagnostics and performance information associated with or pertinent to the offloading of data; and
   assign time-stamp and geo-tag related information to one or more fields or parameters of the diagnostics and performance information.

2. The system of claim 1, wherein the at least one processing circuit is configured to maintain a Wi-Fi related dataset comprising information relating to access to and/or use of Wi-Fi access points (APs) during operation of the mobile node (MN).

3. The system of claim 2, wherein the at least one processing circuit is configured to set up or configure the one or more Wi-Fi connections based on the Wi-Fi related dataset.

4. The system of claim 2, wherein the at least one processing circuit is configured to generate or update the Wi-Fi related dataset based on interactions with Wi-Fi access points (APs) providing coverage within the area.

5. The system of claim 2, wherein the at least one processing circuit is configured to provide to a cloud portal associated with the network of moving things, the Wi-Fi related dataset or information based on the Wi-Fi related dataset.

6. The system of claim 1, wherein the at least one processing circuit is configured to obtain from a cloud portal associated with the network of moving things, Wi-Fi related information configured for facilitating access to and/or use of Wi-Fi access points (APs) providing coverage within the area.

7. The system of claim 1, wherein the at least one processing circuit is configured to set or adjust one or more parameters associated with offloaded data and/or data transfer via the one or more Wi-Fi connections based on pre-set policies or criteria.

8. A system configured for intelligent offloading of traffic to public and private Wi-Fi hotspots in a network of moving things, the system comprising:
  a central portal server that comprises:
    at least one storage circuit configured to store instructions and data; and
    at least one processing circuit configured to, based, at least in part, on instructions and/or data stored in the at least one storage circuit, manage offloading data transfer in an area of the network of moving things to Wi-Fi access points (APs), wherein the managing comprises:
      identifying one or more Wi-Fi access points (APs) providing coverage within the area of the network of moving things;
      processing performance metadata obtained from one or more components or elements of the network of moving things,
        wherein the performance metadata comprises diagnostics and performance information associated with or pertinent to the offloading of data,
        wherein the performance metadata further comprises time-stamp and geo-tag related information associated with one or more fields or parameters of the diagnostics and performance information,
        wherein the processing of performance metadata comprising storing at least a portion of the performance metadata based on the time-stamp and the geo-tag related information, and
        wherein the processing of performance metadata further comprises applying pattern detection to newly recited and previously stored performance metadata;
      based on the processing of performance metadata, configuring for each Wi-Fi access point of the one or more Wi-Fi access points (APs), corresponding Wi-Fi access information configured for facilitating secure access to and use of the Wi-Fi access point by mobile nodes (MNs) operating within service range of the Wi-Fi access point for offloading data transfer;
      maintaining one or more global flow policies for managing data flows and one or more global traffic policies for managing network traffic; and
      distributing information for managing the offloading of data transfer based on the one or more global flow policies and/or the one or more global traffic policies.

9. The system of claim 8, wherein the at least one processing circuit is configured to provide Wi-Fi access information to one or more mobile nodes (MNs) operating in the area of the network of moving things.

10. The system of claim 8, wherein the at least one processing circuit is configured to maintain performance related data associated with the one or more Wi-Fi access points (APs) and use of the one or more Wi-Fi access points (APs) in offloading data transfer.

11. The system of claim 10, wherein the at least one processing circuit is configured to generate or update the performance related data based on reported information from one or more (MNs) operating within the area of the network of moving things.

12. A method configured for intelligent offloading of traffic to public and private Wi-Fi hotspots in a network of moving things, the method comprising:

detecting by a mobile node (MN) deployed in a vehicle, during operation within an area of the network of moving things, Wi-Fi access points (APs) providing coverage within the area;
  setting up one or more Wi-Fi connections to at least one Wi-Fi access points (AP) based on the Wi-Fi access information;
  managing data transfer to and/or from the mobile node (MN), wherein the managing comprises:
    offloading at least a portion of the data transfer to the one or more Wi-Fi connections, wherein the offloading is performed to offload cellular communications; and
    one or both of:
      scheduling of one or more delay-tolerant data flows to be communicated to and/or from the vehicle, based on data management policies; and
      applying traffic shaping, traffic throttling and/or classes of traffic policies for one or more of incoming and outgoing network traffic, based on traffic management policies;
  generating, by the mobile node (MN), performance metadata relating to offloading of data in the mobile node (MN), the performance metadata comprising diagnostics and performance information associated with or pertinent to the offloading of data; and
  assigning time-stamp and geo-tag related information to one or more fields or parameters of the diagnostics and performance information.

13. The method of claim 12, further comprising setting up or configuring the one or more Wi-Fi connections based on Wi-Fi related dataset configured for facilitating secure access to and use of at least one Wi-Fi access points (AP) by mobile nodes (MNs) operating within service range of the Wi-Fi access point for offloading data transfer.

14. The method of claim 13, further comprising maintaining the Wi-Fi related dataset in one or both of the mobile node (MN) and a cloud portal associated with the network of moving things.

15. The method of claim 13, further comprising generating or updating the Wi-Fi related dataset by one or both of the mobile node (MN) and a cloud portal associated with the network of moving things.

16. The method of claim 13, further comprising generating or updating the Wi-Fi related dataset based on interactions with Wi-Fi access points (APs) providing coverage within the area.

17. The method of claim 12, further comprising obtaining from a cloud portal associated with the network of moving things, Wi-Fi related information configured for facilitating access to and/or use of Wi-Fi access points (APs) providing coverage within the area.

18. The method of claim 12, further comprising setting or adjusting one or more parameters associated with offloaded data and/or data transfer via the one or more Wi-Fi connections based on pre-set policies or criteria.

19. The method of claim 18, wherein setting or adjusting the one or more parameters associated with the offloaded data and/or the data transfer via the one or more Wi-Fi connections based on pre-set policies or criteria further comprises applying one or more of data prioritization, scheduling of delay-tolerant, data flow compression, transport protocol configuration, endpoint authentication, storage mechanism, and file-encryption.

20. The method of claim 18, wherein setting or adjusting the one or more parameters associated with the offloaded data and/or the data transfer via the one or more Wi-Fi connections based on pre-set policies or criteria further comprises applying one or more of traffic shaping, throttling, traffic flow compression, caching and buffering, cyphering, and quality-of-service (QOS) configuration.

* * * * *